EFFECT OF REACTION TIME AT CONSTANT TEMPERATURE WITH MOLAR RATIO OF 17 TO 1

EFFECT OF REACTION TIME AT CONSTANT TEMPERATURE WITH MOLAR RATIO OF 35 TO 1

EFFECT OF REACTION TIME AT CONSTANT TEMPERATURE WITH A MOLAR RATIO OF 50 TO 1

EFFECT OF TEMPERATURE AT CONSTANT REACTION TIME WITH A MOLAR RATIO OF 17 TO 1

EFFECT OF TEMPERATURE AT CONSTANT REACTION TIME WITH A MOLAR RATIO OF 35 TO 1

EFFECT OF REACTION TIME AT CONSTANT TEMPERATURE AND A MOLAR RATIO OF 17 TO 1

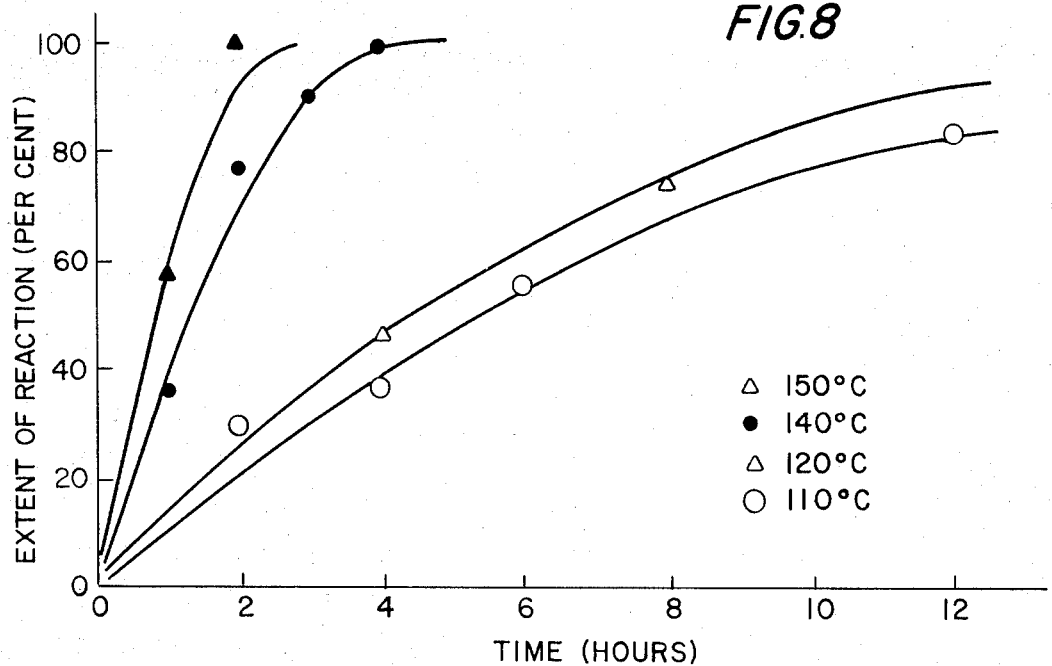
EFFECT OF REACTION TIME AT CONSTANT TEMPERATURE AND A MOLAR RATIO OF 37 TO 1
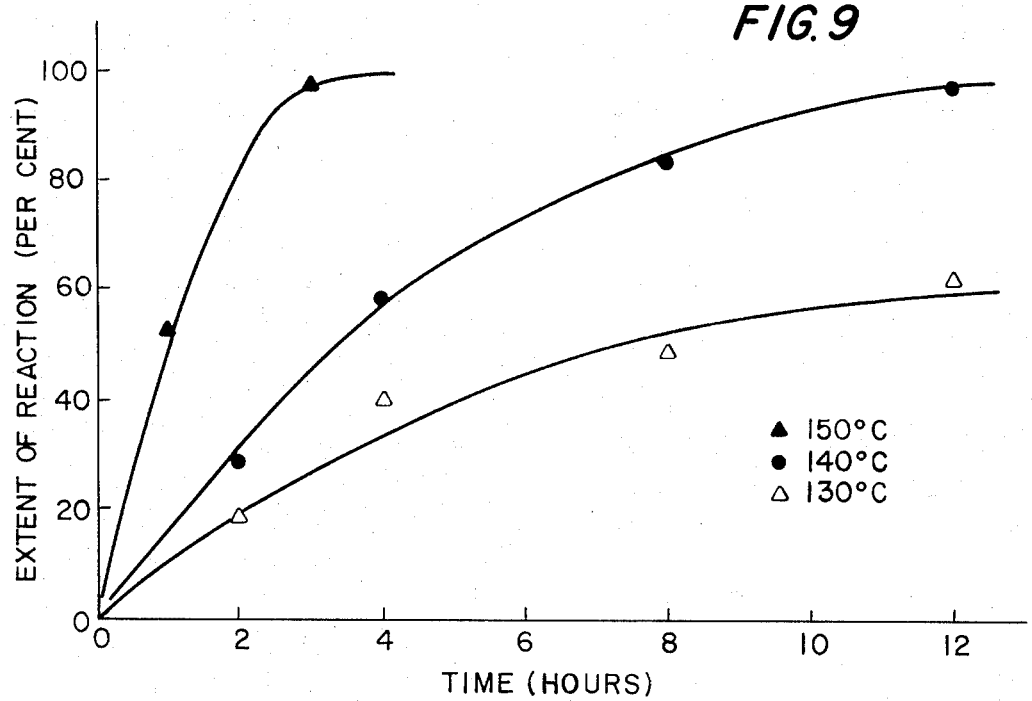
EFFECT OF REACTION TIME AT CONSTANT TEMPERATURE AND A MOLAR RATIO OF 50 TO 1

EFFECT OF TEMPERATURE AT CONSTANT REACTION TIME AND A MOLAR RATIO OF 17 TO 1

REACTION OF PROPYLENE OXIDE WITH EMPOL 1040 IN A MOLAR RATIO OF 20 TO 1 AS A FUNCTION OF TIME AND TEMPERATURE

REACTION OF 1,2 BUTYLENE OXIDE WITH EMPOL 1040 IN A MOLAR RATIO OF 14 TO 1 AS A FUNCTION OF TIME AND TEMPERATURE

REACTION OF PROPYLENE OXIDE WITH EMPOL 1040 IN VARIOUS MOLAR RATIOS AT 190°C

JANA TENSILE SPECIMEN

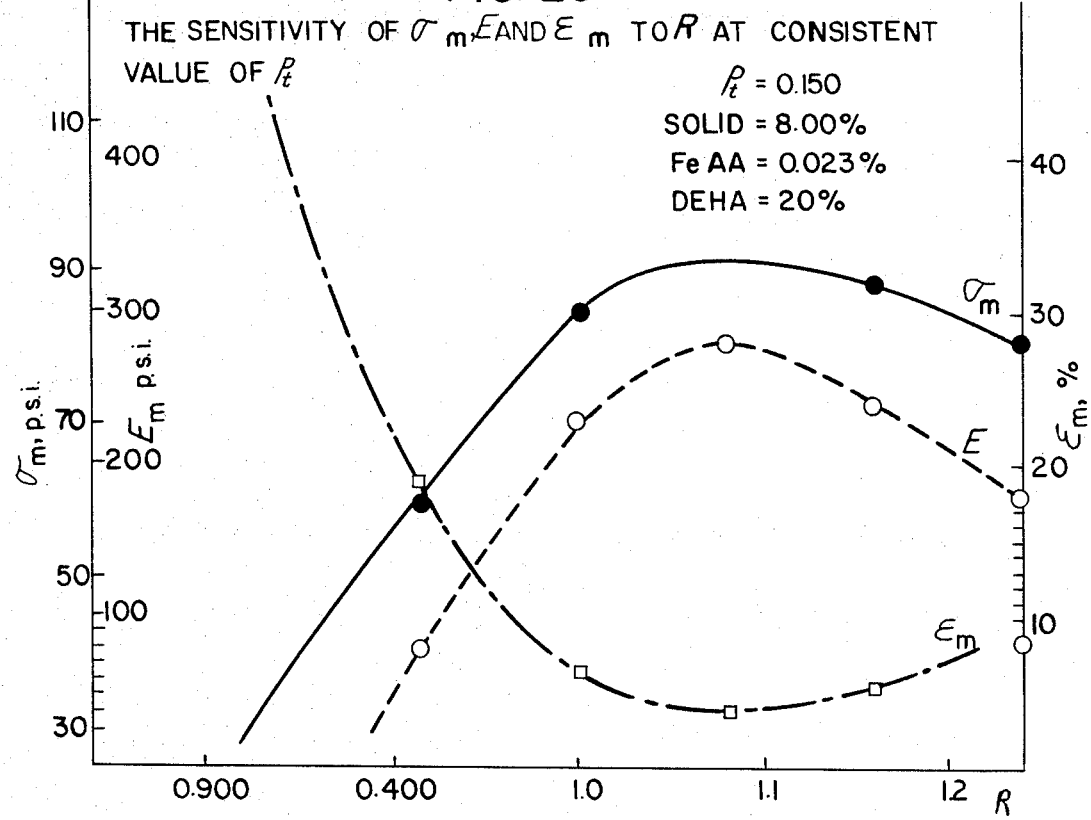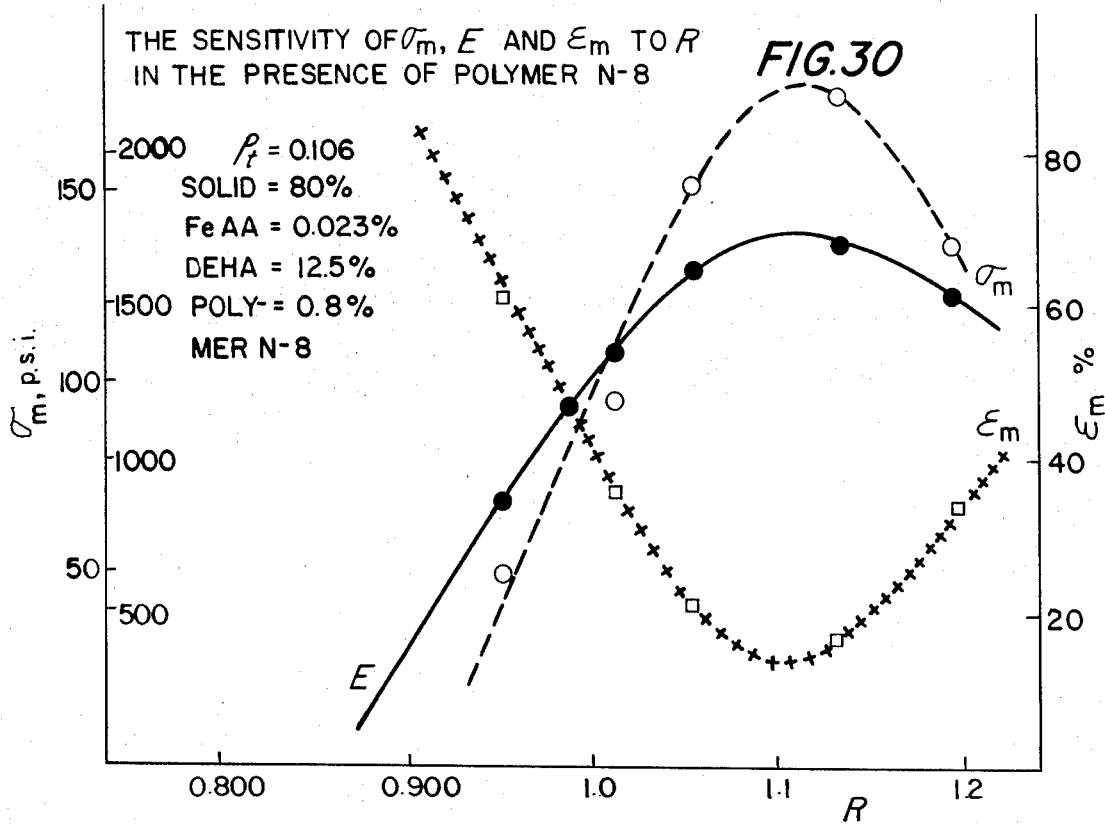

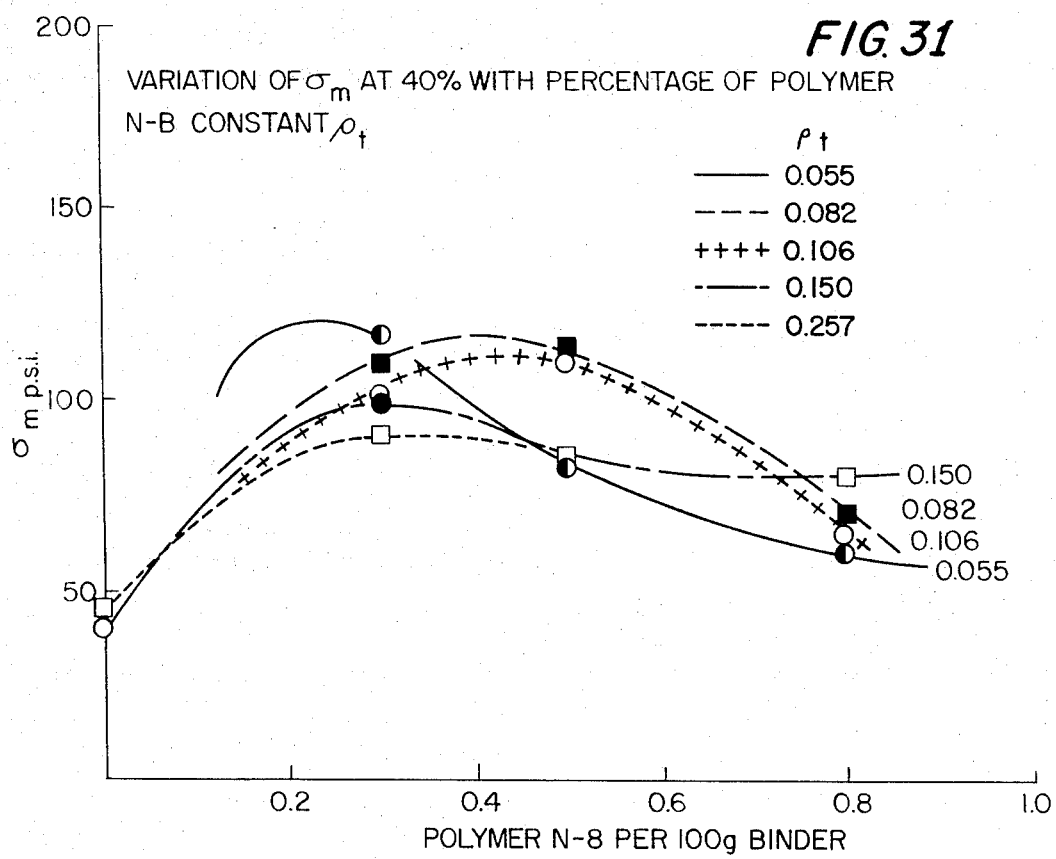
FIG. 31 VARIATION OF $\sigma_m$ AT 40% WITH PERCENTAGE OF POLYMER N-B CONSTANT $\rho_t$
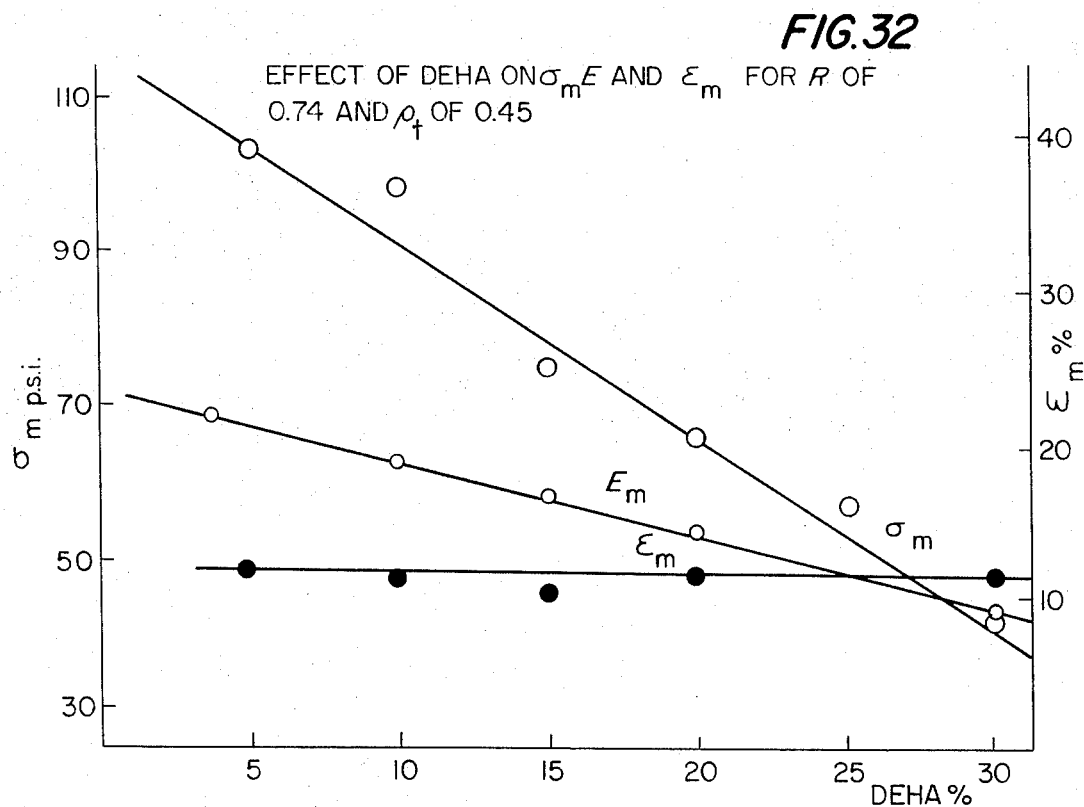
FIG. 32 EFFECT OF DEHA ON $\sigma_m$, $E$ AND $\varepsilon_m$ FOR $R$ OF 0.74 AND $\rho_t$ OF 0.45

United States Patent Office

3,758,426
Patented Sept. 11, 1973

3,758,426
HYDROXY-TERMINATED POLYBUTADIENES
Jean L. Boivin, Ottawa, Ontario, and Meude Tremblay, Quebec, Quebec, Canada, assignors to Her Majesty the Queen in right of Canada as represented by the Minister of National Defense
Filed Sept. 29, 1971, Ser. No. 184,757
Int. Cl. C08d 5/02; C08f 19/14; C08g 45/04
U.S. Cl. 260—18 TN                          10 Claims

ABSTRACT OF THE DISCLOSURE

A hydroxy-terminated polybutadiene is formed by reaction with a carboxy-terminated polybutadiene and an alkylene oxide. The hydroxy polymer has application for use as a binder for solid propellants when cured with a triisocyanate or a diisocyanate and a tris (hydroxy-terminated) polyhydrocarbon.

BACKGROUND OF THE INVENTION

Field of the invention

The present invention relates to hydroxy telechelic polymers and to their use as elastomeric binders. The invention also relates to a novel triol utilized as a cross-linking agent in curing the telechelic polymer.

Description of the prior art

Polybutadiene propellants have as a binder an elastomer formed from a heretofore known carboxyl terminated homo-, co-, or terpolymer of polybutadiene and a curing system which involves aziridines or epoxides either alone or in combination. This curing system with which carboxyl groups of the polybutadiene react to produce amide links when tris(2-methylaziridinyl)phosphine oxide (MAPO) is the cross-linking agent or ester links when polyepoxides are the cross-linking agent, requires a curing time up to two weeks. In addition to the long period of curing which is necessary to obtain propellants of fair quality, the aziridine has many drawbacks as it is toxic, has a tendency to degrade when subjected to prolonged heating, under high relative humidity or hot conditions, and it also tends to post cure thus increasing the modulus of the binder and the resultant propellants. While these drawbacks may be partially removed by the addition of the butylene imine derivative of trimesic acid (BITA), these imines are also unstable to heat and humidity, especially BITA which decomposes at about 0° C. Further the imines are hazardous materials as they produce dermatitis on contact with the skin. Finally, the oxidizer ammonium perchlorate which is incorporated into the binder to form the rocket propellant also reacts exothermically with aziridines leading to fires.

In view of the aforesaid disadvantages attempts have been made to substitute the MAPO-epoxide curing system into the binders for the propellants. One such attempt has been the production of hydroxyl-terminated polybutadiene, (which may be cured by isocyanates) by the living polymer synthesis followed by treatment thereof with ethylene oxide, alcohols or water. However, the living polymer synthesis yielded hydroxy terminated polybutadienes rich in the tran and vinyl structure (60 and 20 percent respectively), which produced elastomeric binders unsuitable for low temperature operation. Further these hydroxyl terminated polybutadienes also exhibit a reactivity with isocyanate which is too high for propellant use having, inter alia, a short pot life.

Another attempt to replace the MAPO-epoxide curing system involves utilizing the desirable properties of the carboxyl terminated polybutadiene such as that supplied under the trademark HC 434 by Thiokol Chemical Corporation which has a high percentage of cis-structure (32%). This carboxyl terminated polybutadiene was reduced with lithium hydride into a hydroxyl polybutadiene for curing with isocyanates and while in this way the low temperature properties of the polymer were preserved, the gelatin time with 2,4-tolylene diisocyanate was about 3 hours at 80° F. which is considered to be much too short to be useful in the production of binders in propellant manufacture. This fast cure was attributed to the presence of primary terminal hydroxyl groups in the hydroxy-terminated polybutadiene. Moerover the purification process of the hydroxy-terminated polybutadiene was difficult as it left 0.15% residual solids which interfered in the curing reaction.

SUMMARY OF THE INVENTION

According to the present invention there is provided a hydroxy-terminated polybutadiene that is particularly useful in forming rocket propellants. Its advantages arise from the desirable mechanical properties it exhibits at low temperature. Other aspects of the present invention lie in the elastomer binders and methods of preparing such materials for use as propellants and low temperature insulating and structural parts. In particular, a novel triol cross-linking agent has been provided that is used in conjunction with diisocyanate to cure the elastomeric mixes of the present invention.

Other features and attendant advantages of the present invention will become apparent to those skilled in the art from a reading of the following detailed description taken in conjunction with the accompanying drawing wherein:

BRIEF DESCRIPTION OF THE DRAWINGS

FIGS. 7–9 are similar graphs to those of FIGS. 1 to 3 in which 1,2-butylene oxide is reacted with the carboxyl-terminated polybutadiene.

FIGS. 29–32 are graphs showing how the mechanical properties of the propellant varies with composition.

DESCRIPTION OF THE PREFERRED EMBODIMENTS

Figure 1:
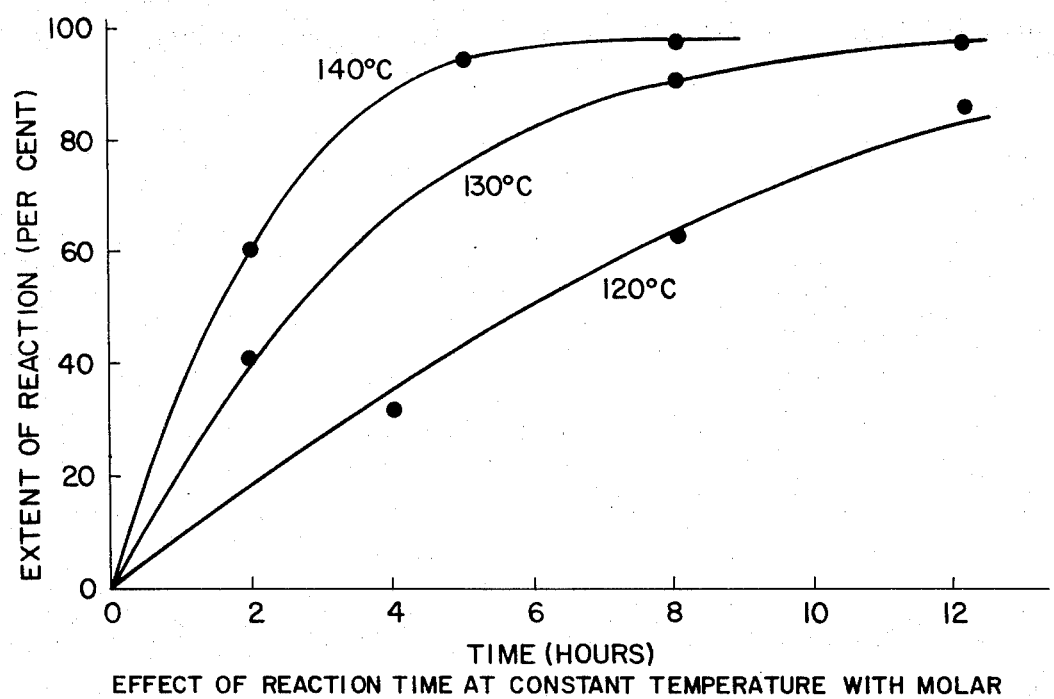
FIGS. 1 to 3 are graphs showing plots of reaction time against extent of reaction at different constant reaction temperatures and different molar ratios of the reactant carboxyl terminated polybutadiene supplied under the trademark HC 434 by Thiokol Chemical Corporation and propylene oxide.

The term "telechelic polymer" as set forth in U.S. Pat. No. 3,281,335 issued Oct. 25, 1966 to C. A. Wentz and E. E. Hopper defines polymers which are produced by polymerization of vinylidene containing monomers having reactive groups at each end of the polymer molecule. The present invention particularly provides hydroxy telechelic polybutadiene and imine particularly hydroxy terminated polybutadienes, desirably rich in cis-isomer, obtained by reaction of a mono-epoxy compound and the corresponding carboxy polymers. The term hydroxyl-terminated as used herein means a polymer having hydroxyl groups, including primary and secondary hydroxyl groups attached adjacent the ends of the polymer molecule and preferably at the ends of the molecule. The mono epoxy compound may be any organic compound containing a single epoxy grouping including mono-epoxy resin: particularly preferred however are epoxy compounds of the formula

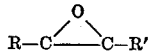

wherein each of R and R' is hydrogen, or an alkyl radical containing from 1 to 6 carbon atoms. Particularly there may be mentioned 1,2-alkylene oxides such as propylene oxide and 1,2-butylene oxide which produce secondary hydroxyl groups when reacted with the carboxyl telechelic polymer.

The hydroxyl telechelic polymer of the present invention may be prepared by heating the carboxyl telechelic polymers under superatmospheric pressure suitably autogenous pressure in an autoclave with a molar excess, suitably a large molar excess, of the mono-epoxy compound for a time and at a temperature sufficient to substitute all the carboxyl groups in the carboxyl-terminated polybutadiene with terminal hydroxyl groups.

The reaction of the epoxide with the carboxy telechelic polymer e.g., the carboxyl-terminated polybutadiene which is suitably that supplied under the trademark HC 434 by Thiokol Chemical Corporation or that supplied under the trademark Hycar-CTB by B. F. Goodrich and Company, is effected under such conditions as to have substantially complete reaction between the carboxyl groups and the epoxide to produce terminal hydroxyl groups. Thus, the reaction temperature, time of reaction and molar ratio of the epoxide oxide to carboxyl polymer can be varied considerably although the esterification of carboxy terminated polybutadienes with the 1,2-alkylene oxides, propylene oxide and 1,2-isobutylene oxide at a temperature of less than 110° C. leads to excessively long reaction times even with a large molar excess of the alkylene oxide to obtain substantially complete reaction. The presence of carboxyl groups in the product is detrimental to the properties of the hydroxyl telechelic polymer in its use in forming the elastomeric binder and for example, causes undesirable foaming during the production of the binder.

As the reaction between the carboxyl polymer and the epoxide is essentially an esterification reaction, a molar excess of esterifying agents, i.e. an epoxide, should be used to prevent the reverse reaction. Thus, for the reaction between a carboxy terminated polybutadiene with the 1,2-alkylene oxides, propylene oxide and 1,2-isobutylene oxide, a molar ratio of alkylene oxide to carboxyl terminated polybutadiene of at least 17:1 to about 50:1 will work under the proper conditions.

The temperature of reaction for the 1,2-alkylene exides is desirably at least 110° C. and more preferably at least 120° C. in order to obtain complete reaction within a reasonable period of time of the order of up to 12 hours. With propylene oxide the preferred temperature is in the range 120 to 140° C. and with 1,2-butylene oxide the reaction is suitably conducted at a slightly higher temperature such as 130 to 150° C. In general, for the 1,2-alkylene oxides a reaction temperature in the range 120 to 150° C. for a period of time in the range of 2 to 12 hours under autogeneous pressure, produces a substantially completely reacted carboxyl terminated polybutadiene in which the terminal carboxyl groups have been substantially replaced by secondary hydroxyl groups. Completion of the reaction may be easily ascertained by determining the acid number by titration with a sodium methylate solution.

The reaction is suitably effected in an autoclave under autogenous pressure. Due to its higher boiling point, 1,2-butylene oxide has a lower vapor pressure in the reaction vessel, thus allowing for low pressure kettles to be used. At 140° C. with propylene oxide, autogenous maximum reaction pressures in the range 78 to 132 p.s.i.g. were found to obtain for molar ratios of propylene oxide to carboxyl-terminated polybutadiene from 17:1 to 50:1. The resulting hydroxyl-terminated polybutadiene obtained by the process of the present invention is found to have the same isomer configuration after heating as the original carboxyl-terminated polybutadiene. Thus, when using a carboxyl-terminated polybutadiene rich in cis-isomer, the product hydroxyl-terminated polybutadiene is also rich in cis-isomer which renders it highly suitable as aforesaid for the production of elastomeric binders in polybutadiene propellants.

The production of the hydroxyl-terminated polybutadienes according to the present invention is illustrated in the following examples taken in conjunction with the accompanying drawings.

EXAMPLE I

A series of solutions of 80 gms. (0.02 mole) of a carboxyl-terminated polybutadiene supplied under the trademark HC 434 by Thiokol Chemical Corporation in 58 gms. (1 mole), 40 gms. (0.684 mole) and 20 gms. (0.342 mole) of propylene oxide to provide molar ratios of 50:1, 35:1 and 17:1 were made up. Each solution was placed in a pressure vessel which was vented and heated at a selected temperature for a selected period of time, the temperatures ranging from 100–140° C. and the time ranged from 4 hours to 12 hours, the pressure conditions were, in general, autogeneous pressure conditions. When the reaction was terminated the acid number of each solution was measured by titration with a sodium methylate solution prepared by dissolving 4.6 grams of clean metallic sodium in reagent grade methanol diluted to one liter with the same solvent and standardized against the 0.1 normal HCl using thymol blue indicator. The thymol blue indicator was obtained by dissolving 0.3 gram of thymol blue in 100 ml. of methanol. The extent of the reaction was calculated from the original acid number of the carboxyl-terminated polybutadiene. The pressure in the pressure vessels during the course of the reaction was continuously measured by means of a pressure gauge fitted to the vessel.

Figure 2:
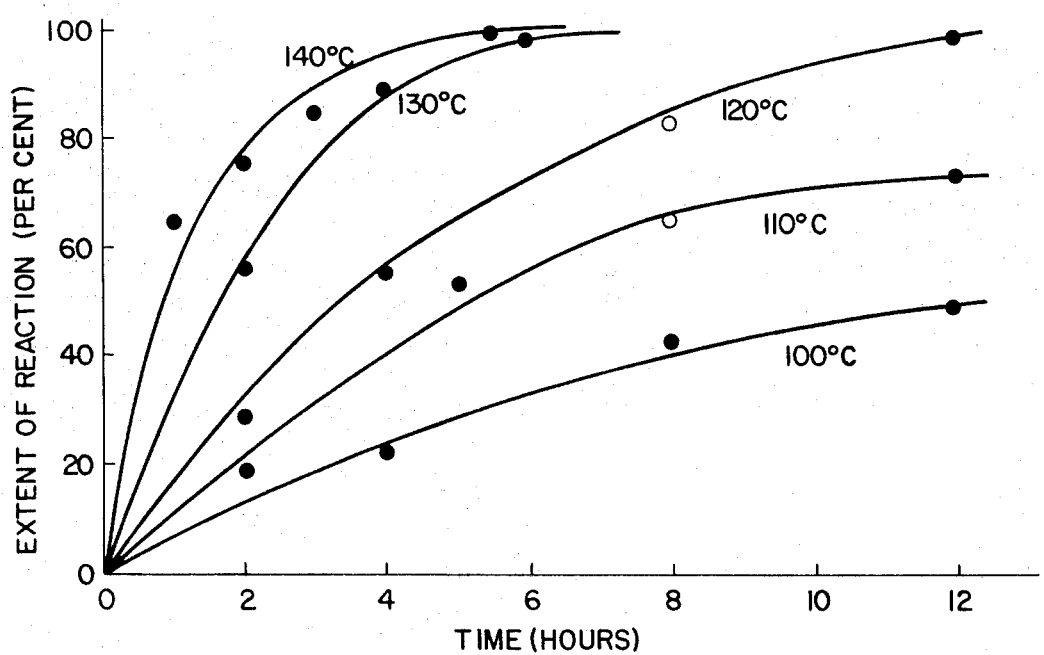
Figure 3:
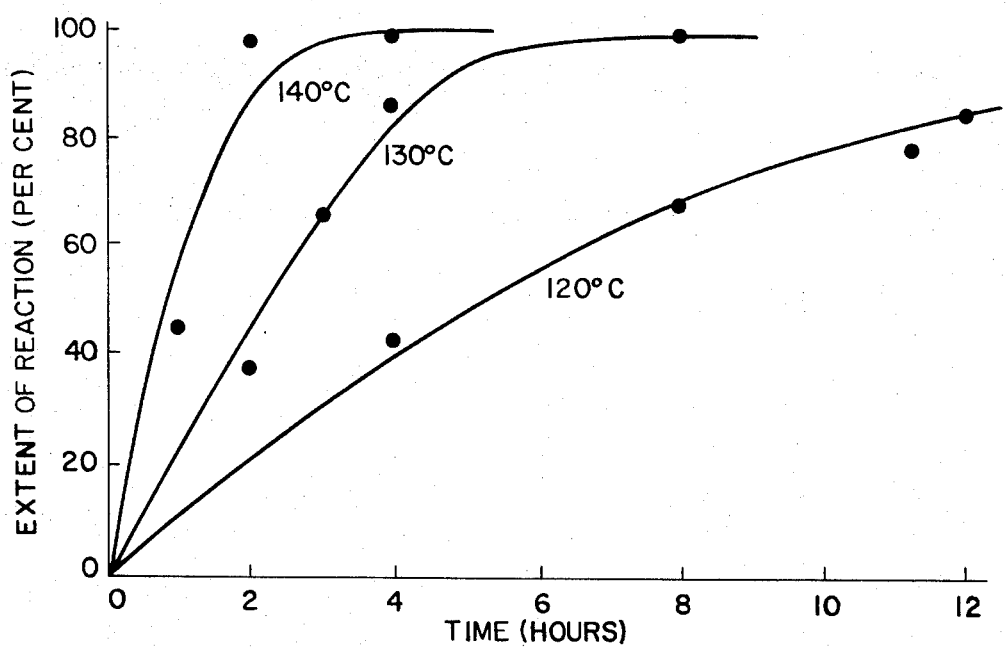
Figure 4:
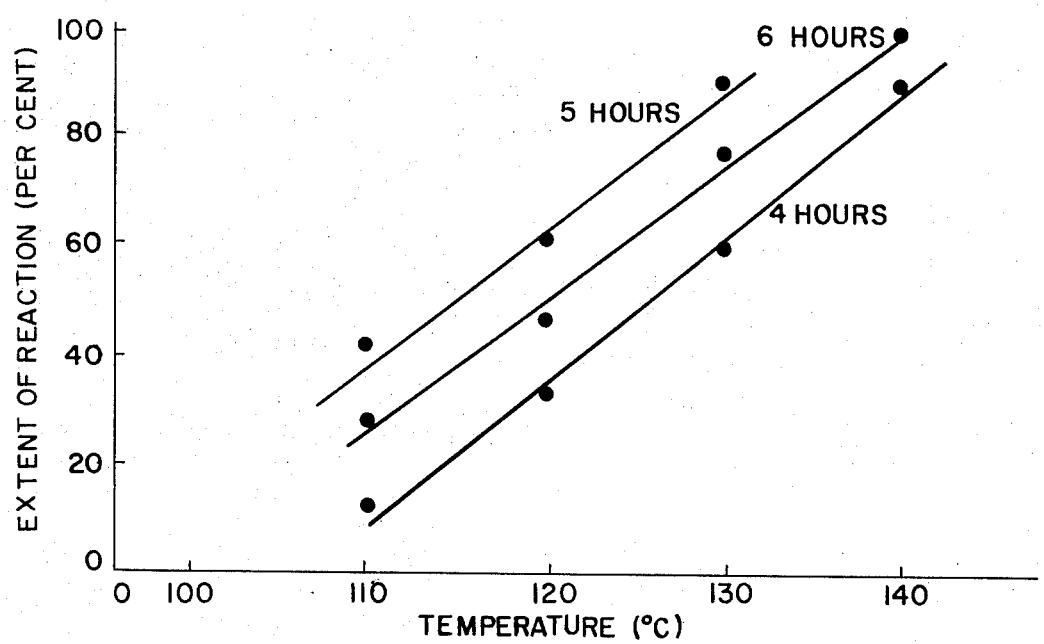
FIGS. 4 and 5 are graphs showing plots of reaction temperature against extent of reaction at different constant reaction times and different molar ratios of reactants in FIGS. 1 to 3.
Figure 5:
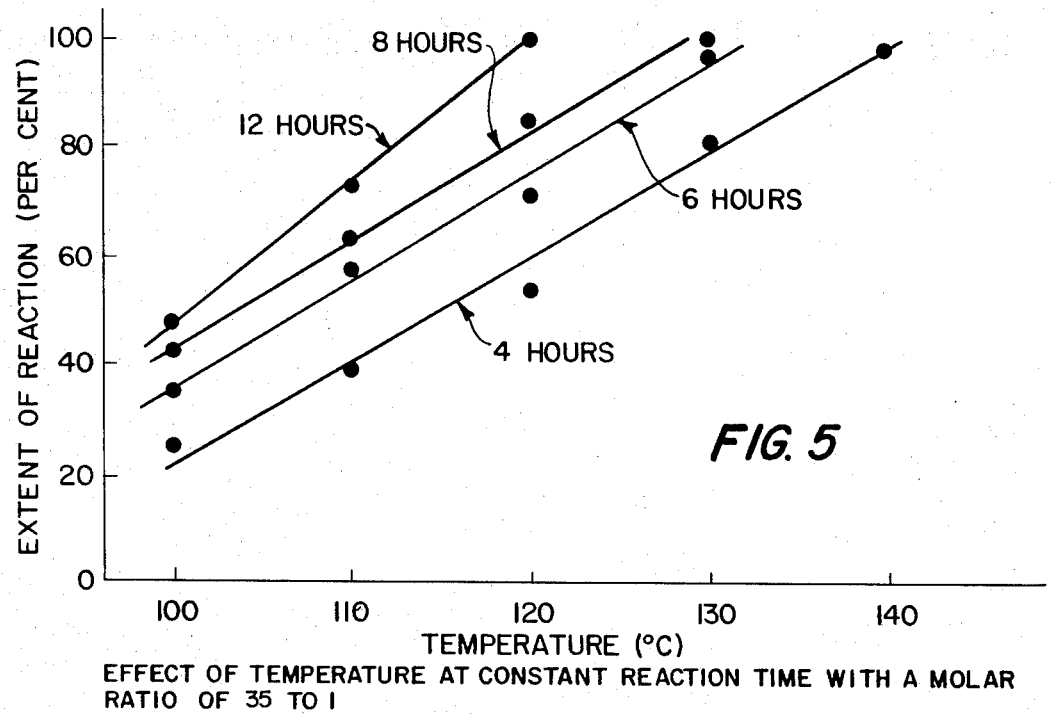

The results obtained are given in FIGS. 1–5 of the accompanying drawings. FIGS. 1–3 are plots of reaction time against extent of reaction at different constant temperatures and different molar ratios of reactant. FIGS. 4 and 5 are plots of extent of reaction against temperature at different constant reaction times and different molar ratios of reactants. The following Table A shows the maximum pressure in the pressure vessels at the different temperatures and the different molar ratios of reactants.

TABLE A

Maximum pressure of the propylene oxide HC-434 esterification: HC-434:80 g. (0.02 mole)

| Temperature, ° C. | Maximum pressure of propylene oxide (p.s.i.g.) | | |
|---|---|---|---|
| | 30 g. (0.343 mole) | 40 g. (0.684 mole) | 58 g. (1.0 mole) |
| 100 | 37 | 36 | 53 |
| 110 | 48 | 46 | 72 |
| 120 | 58 | 60 | 85 |
| 130 | 69 | 70 | 102 |
| 140 | 78 | 89 | 132 |

It will be seen from FIGS. 1-5 that a temperature below 110° C. is generally not practical for obtaining complete conversion of the carboxyl-terminated polybutadiene to the hydroxyl-terminated polybutadiene because the reaction is very slow even at a 50:1 molar ratio of propylene oxide to HC 434. Thus, from a production point of view while the reaction should be carried out at the lowest temperature possible so as to maintain the lowest reaction pressure in the reaction vessel, it would generally be impractical to operate at a temperature lower than 110° C. as the reaction rate is generally too slow and the reaction time too long. However, a rise of temperature of about 30° C. from 110° C. to 140° C., while increasing the specific reaction rate constant 10 times, also increases the reaction pressure as will be seen from Table A. Thus, the most satisfactory method for preparing the hydroxyl-terminated polybutadiene is to heat the carboxyl-terminated polybutadiene with propylene oxide under autogenous pressure in a pressure vessel at a temperature in the range 120 to 140° C. for a reaction period of 2 to 12 hours in a molar ratio of propylene oxide to carboxyl-terminated polybutadiene in the range 17:1 to 50:1 and preferably about 35:1. It will be seen from FIGS. 1 to 5 that the molar ratio of about 35:1 propylene oxide to carboxyl-terminated polybutadiene always gives better conversions at all temperatures. This phenomena is unexpected and it is believed that an excess of the propylene oxide over 35 mols does not increase the reaction rate to a large extent but acts as a solvent for the reaction mixture. When the reaction is over, or when the acid content of the carboxyl-terminated polybutadiene is decreased by about 95%, the viscous material is evaporated under reduced pressure to remove the unreacted propylene oxide.

A typical molecule of the hydroxyl-terminated polybutadiene rich in cis-isomer according to the present invention has a molecular weight between 3000 and 4000. When prepared according to Example I, i.e., by reaction of a large molar excess of propylene oxide with the carboxyl-terminated polybutadiene rich in cis-isomer supplied under the trademark HC 434 which has a molecular weight of about 3,800, its structure is believed to be as follows:

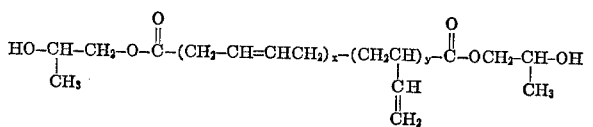

wherein $x$ and $y$ each vary between 1 and 67.

The hydroxyl-terminated polybutadiene when butylene oxide is the alkylene oxide has been found by OH determination to have a molecular weight of about 3400 and by vapor phase osmometer determination 3630. As will be seen from FIG. 6 of the accompanying drawings in which the infra red spectrum of the carboxyl-terminated polybutadiene, supplied under the trade name HC 434 by Thiokol Chemical Corporation, is compared with the infra red spectrum of the hydroxyl-terminated polybutadiene obtained by reacting the carboxyl-terminated polybutadiene with propylene oxide, carboxyl groups were absent from the hydroxyl-terminated polybutadiene and the hydroxyl-terminated poly-butadiene has the same isomer configuration as the carboxyl-terminated polybutadiene.

In the production of a hydroxyl-terminated polybutadiene rich in cis-isomer by reaction of the carboxyl-terminated polybutadiene rich in cis-isomer with 1,2-butylene oxide generally the same conditions apply as for the propylene oxide as hereinbefore stated and is illustrated in the following example.

EXAMPLE II

Figure 10:
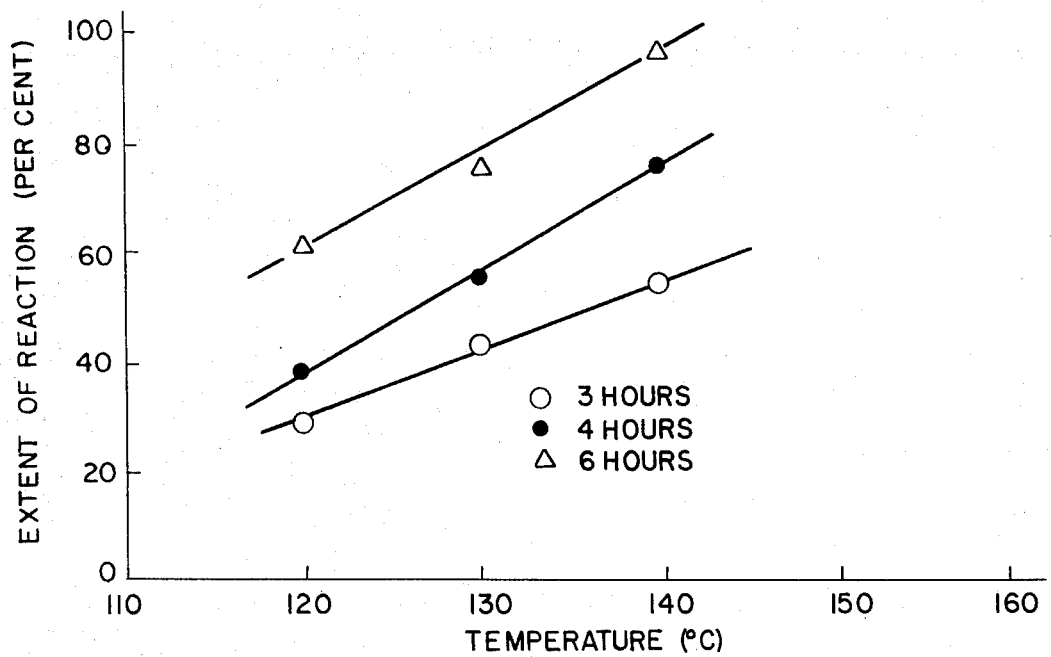
FIG. 10 is a graph similar to those of FIGS. 4 and 5 in which 1,2-butylene oxide is reacted with the carboxyl-terminated polybutadiene.

Solutions of 60 grams (0.015 mol) of a carboxyl-terminated polybutadiene supplied under the trademark HC 434 by Thiokol Chemical Corporation in 18.9 grams (0.262 mol), 37.8 (0.525 mol) and 54 grams (0.75 mol) respectively, 1,2-butylene oxide, giving molar ratios of 17:1, 35:1 and 50:1 of carboxyl-terminated polybutadiene to 1,2-butylene oxide, were placed in a 330 ml. pressure vessel. Each pressure vessel was vented and heated at a selected temperature for a predetermined period of time under generally autogenous pressure. Again, the maximum pressure in the vessel during the reaction was measured by means of a pressure gauge. The acid number was measured on completion of the reaction by titration with sodium methylate solution as set forth in Example I. The results are given in FIGS. 7–10 of which FIGS. 7–9 are plots of the extent of reaction at different constant temperatures at various molar ratios with reaction time and FIG. 10 is a plot of the extent of reaction at different constant reaction times and at a constant molar ratio of reactants.

Figure 7:
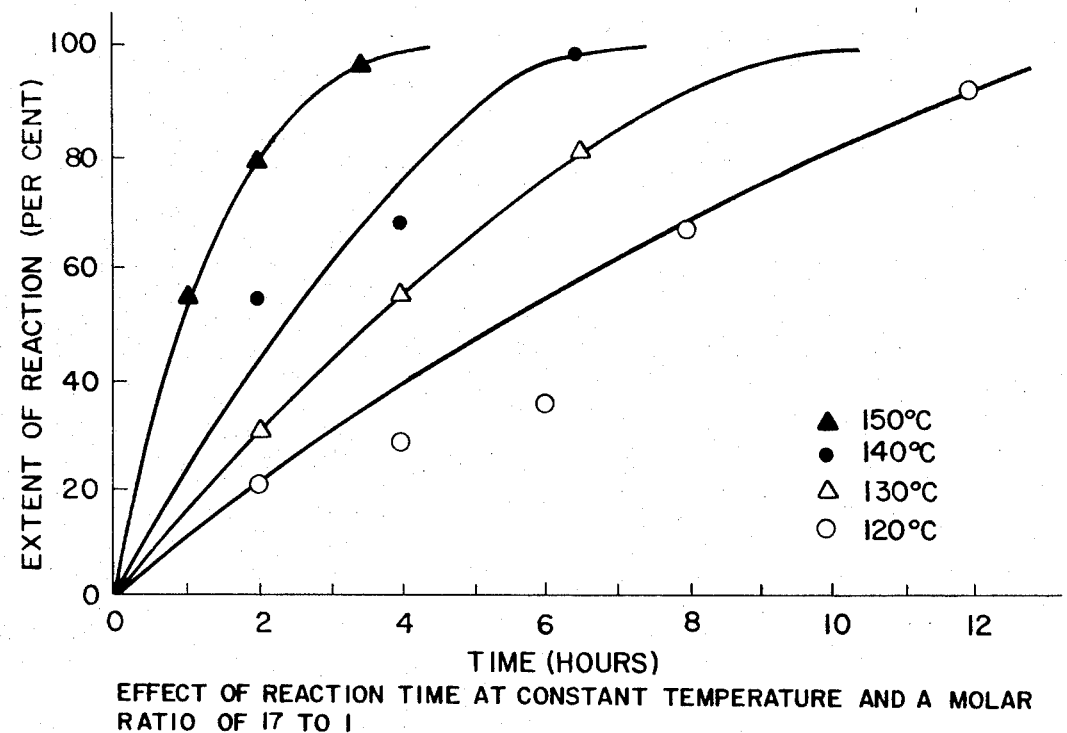
Figure 6:
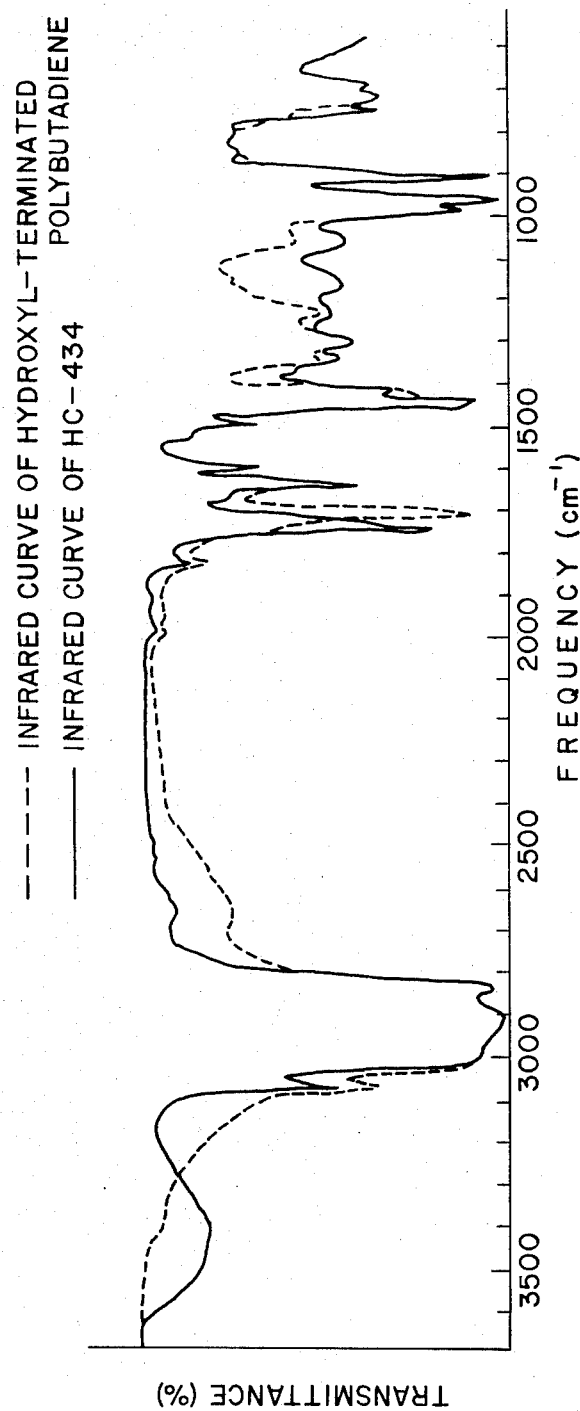
FIG. 6 shows the infra-red spectra of the carboxyl-terminated polybutadiene supplied under the trademark HC 434 by Thiokol Chemical Corporation compared with the infra-red spectra of the hydroxyl-terminated polybutadiene obtained by reacting the carboxyl-terminated polybutadiene with propylene oxide.

It will be seen from FIGS. 6–8 that the temperature should be raised to 150° C. to obtain quantitative conversion at a molar ratio of propylene oxide to carboxyl-terminated polybutadiene of 17:1 and that the period of reaction is shorter when the excess of 1,2-butylene oxide is decreased. The molar ratio of alkylene oxide to carboxyl-terminated polybutadiene of 17:1 is not as efficient as molar ratios in the range 35:1 to 50:1. Between 35:1 and 50:1, however, the variation in conversion is very small. At higher molar ratios of 1,2-butylene oxide the reaction rate is slower owing to solvent dilution effects and the extent of the reaction is quantitative after 12 hours at a minimum temperature of 140° C. At lower temperatures the reaction time is long and the conversion takes several days. The reaction is very sensitive to an increase of temperature and becomes quantitative after 3 hours at 150° C. In particular, it will be seen that the minimum temperature required for the reaction to be complete is 140° C. for 6 hours. At low temperatures the time of heating will be too long for practical purposes. In general, therefore, the reaction of the carboxyl-terminated polybutadiene with the 1,2-butylene oxide is accomplished at higher temperatures than with propylene oxide and could be carried out at 160° or 170° C. for one hour or less depending on the reaction vessel pressure limits. The higher boiling point of the 1,2-butylene oxide leads to lower vapor pressures in the reaction vessel allowing for low pressure kettles to be used.

Another hertofore unsolved problem in utilizing the hydroxyl-terminated polybutadiene system using a diisocyanate curing agent was the lack of a compatible triol cross-linking agent. Thus, all the known triols such as 1,2, 6-hexane triol or polymeric triols heretofore available, are insoluble in hydroxyl-terminated polybutadiene and have yielded elastomers of relatively poor mechanical properties. According to the present invention there is thus provided an improved triol cross-linking agent which is a tris hydroxy-terminated polyhydrocarbon and is the reaction product of a tris(carboxy-terminated)polyhydrocarbon and the aforesaid mono-epoxy compound.

The tris(carboxyl-terminated)polyhydrocarbon is suitably a tri-acid supplied under the trademark Empol 1040 by Emery Industries, Inc. It is obtained by the polymerization of unsaturated C18 fatty acids and is essentially a mixture of tri and di-acids approximately 90% and 5%, respectively with the residual being a monobasic acid. The tri-acid portion is a 54 carbon tribasic acid having a molecular weight of 845. Empol 1040 has an acid value of 0.214 equivalents per hundred grams and a viscosity of 1790 centistokes at 75° F.

The tris(hydroxyl-terminated)polyhydrocarbon is obtained under substantially similar conditions to the hydroxyl-terminated polybutadienes. Namely, by reacting the tris(carboxyl-terminated)polyhydrocarbon under superatmospheric pressure with the epoxide e.g., the alkylene oxide selected from propylene oxide and 1,2-butylene oxide at a temperature and for a period of time sufficient to convert essentially all the carboxyl groups to hydroxyl groups such as secondary hydroxyl groups. The process again involving an esterification reaction, a molar excess of the epoxide should be present and suitably a large molar excess of the epoxide should be used. The molar ratio from practical consideration of the 1,2-alkylene oxide to tris(carboxy-terminated)polyhydrocarbon should be at least 14:1 and desirably in the range 14:1 to 20:1. At molar ratios of the 1,2-alkylene oxide to tricarboxylic acid of less than 14:1 the time taken for complete reaction even at elevated temperature within the range 180 to 200° C. becomes excessively long. However, to obtain substantially complete reaction of the tricarboxylic acid with the 1,2-alkylene oxide, a temperature of at least 120° C. is for practical considerations required and desirably in the range 150 to 220° C. for a period of time extending from 2 to 12 hours.

Figure 11:
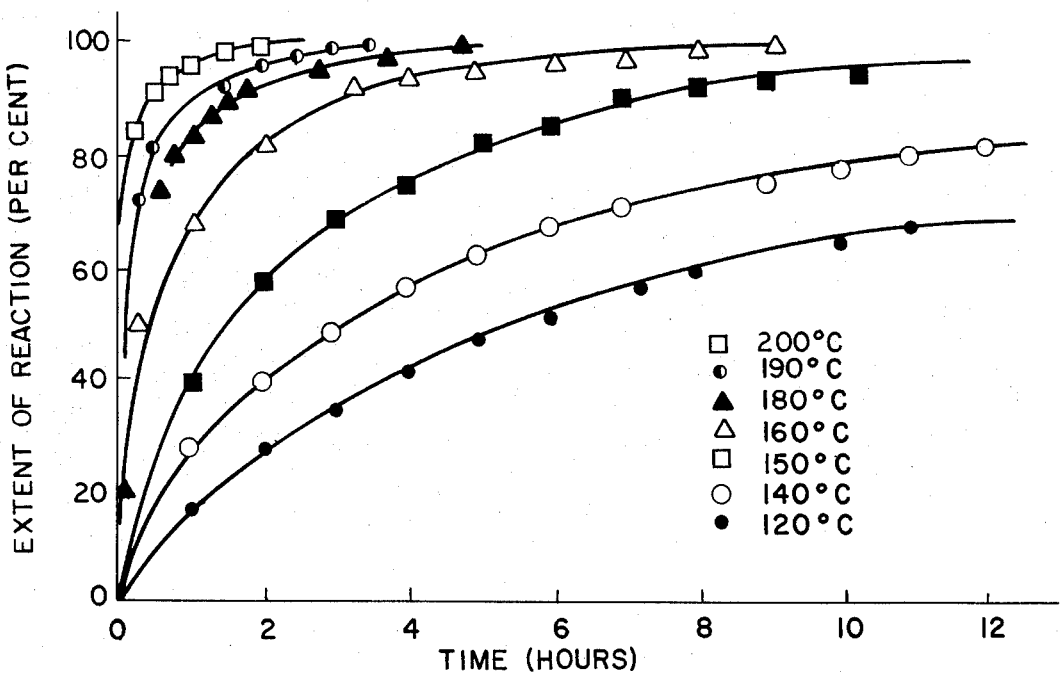
FIGS. 11 and 12 are graphs similar to those of FIGS. 1 to 3 and 7 to 9 in which a tris(carboxy-terminated)hydrocarbon supplied under the trademark Empol 1040 by Emery Industries Inc. is reacted with propylene oxide (FIG. 11) and in 1,2-butylene oxide (FIG. 12)
Figure 12:
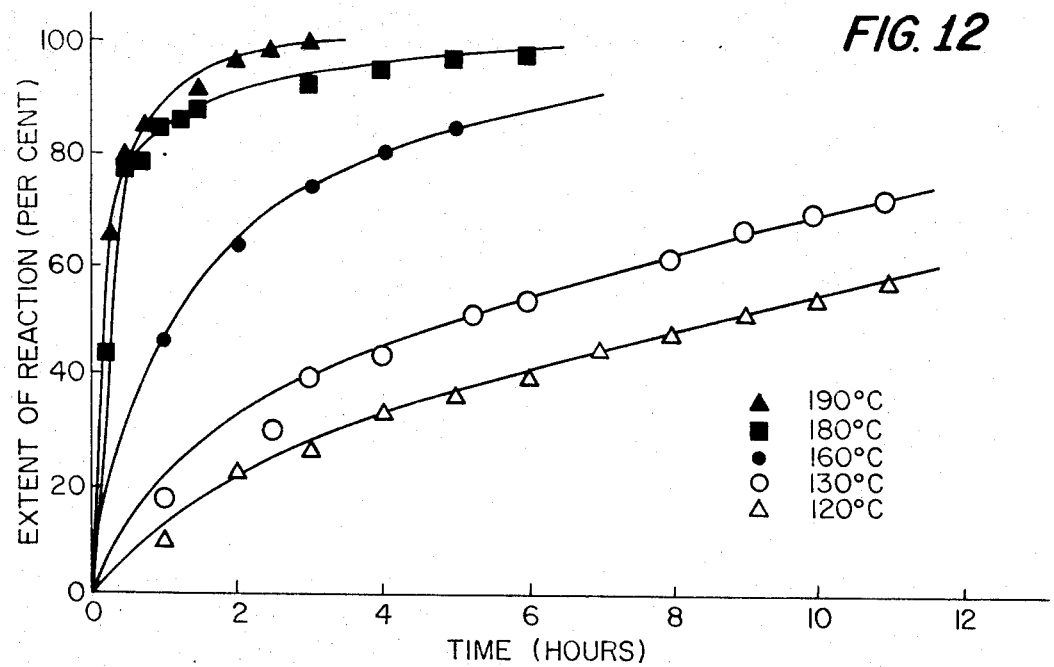
Figure 13:
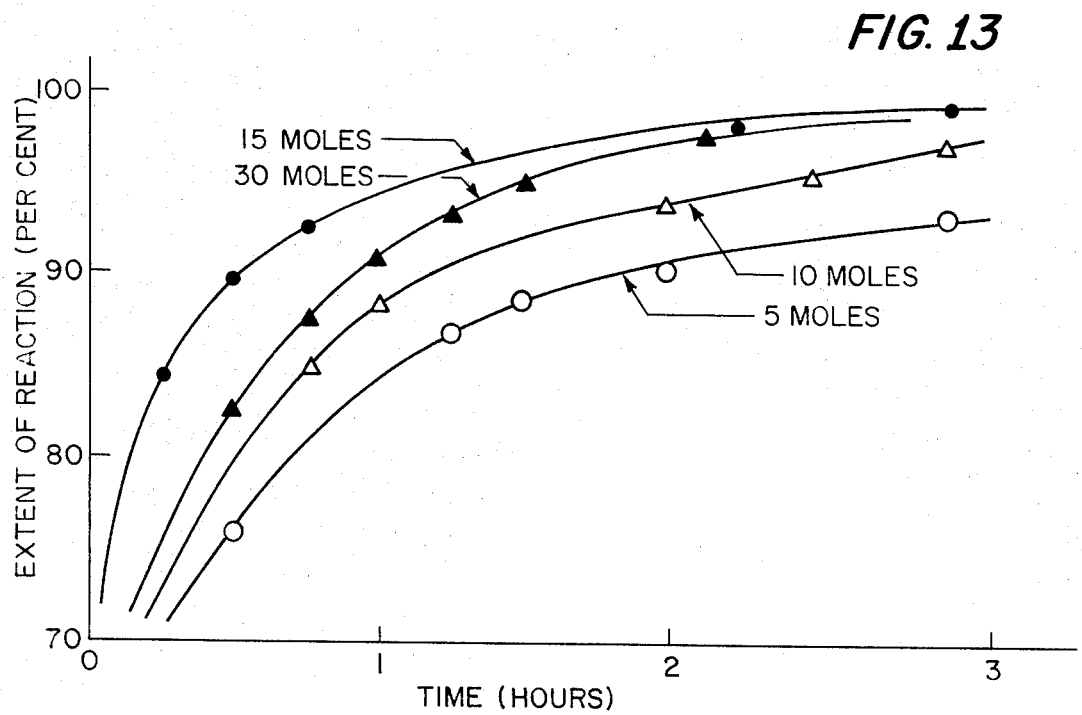
FIG. 13 is a graph of extent of reaction of propylene oxide with Empol 1040 with time at constant temperature of 190° C. and various molar ratios.

The reaction between the epoxide and the tricarboxylic acid is suitably conducted under autogenous pressure in a stirred autoclave and because of the large molar excess of epoxide used in the reaction the vapor pressure in the autoclave has a very minor effect on the conversion of the tricarboxylic acid into the tris(hydroxy-terminated)polyhydrocarbon. The particular mono-epoxy compound from which the tris(hydroxy-terminated)polyhydrocarbon is prepared, such as propylene oxide or 1,2-butylene oxide, does not materially affect its behavior as a cross-linking agent in the production of the elastomeric binder for the castable propellant. However, the reaction of the propylene oxide with the tri-acid is faster than that of the butylene oxide with the tri-acid. The preparation of the tris(hydroxy - terminated)polyhydrocarbon is illustrated in the following Examples III and IV taken in conjunction with FIGS. 11 to 13 of the accompanying drawings. FIGS. 11 and 12 are plots of the extent of reaction with time at various constant temperatures for different molar ratios of propylene oxide and 1,2-butylene oxide with Empol 1040 and FIG. 13 is a plot of the extent of reaction time at a constant temperature of 190° C. with different molar ratios for the reaction of propylene oxide with Empol 1040.

EXAMPLE III

Various solutions of 900 grams (1.0 mol) of Empol 1040 tri-acid in either 1160 grams (20 mols) of propylene oxide or 1008 grams (14.0 mols) of 1,2-butylene oxide were made up and placed in a kettle maintained at a constant temperature for varying periods of time. The kettle was a one gallon stirred pressure vessel electrically heated at a constant temperature regulated by a Pyrovane controller (Pyrovane is a trademark of Honeywell International, Philadelphia, Pa.) which is actuated by a thermocouple. Samples were taken from the various solutions at a regular time intervals, the volatile portion removed under vacuum with a rotary film evaporator and a weighed amount of the material was titrated against 0.02 molar sodium methylate solution as is in Examples I and II to determine the residual carboxyl content from which the extent of reaction was calculated. The pressures in the autoclaves were measured when using the 1,2-butylene oxide by means of a pressure gauge attached to the pressure vessel.

EXAMPLE IV

As with Example III, separate solutions of 900 grams (1 mol) of Empol 1040 tri-acid in 290 grams (5.0 mols), 580 grams (10.0 mols), 870 grams (15.0 mols), and 1740 grams (30 mols) of propylene oxide were made up and the reaction effected at 190° C. in a similar manner as in Example III. The results obtained are shown in FIG. 13.

It will be seen from the Examples III and IV and FIGS. 11 to 13 that a large excess of alkylene oxide is necessary to lead up to quantitative conversion of the Empol 1040 tri-acid to the tris(hydroxy-terminated)hydrocarbon. Most suitably, 14 to 20 mols of alkylene oxide were reacted over a temperature in the range of 120 to 220° C.

With both propylene oxide and 1,2-butylene oxide the time of reaction was observed to vary from 1 to several hours over the temperature range 120 to 220° C. to attain complete conversion. The reaction of the propylene oxide is very fast at 200° C. and is completed in less than 2 hours, whereas it would take days at 120° C. if an equilibrium were to be achieved at a molar ratio of 20:1 alkylene oxide to tri-acid. The same trend is observed with 1,2-butylene oxide but the reaction is slower. Because of the large excess of alkylene oxide used in the reaction the vapor pressure in the autoclave has a very minor effect upon the conversion of the Empol 1040 tri-acid into the hydroxyl derivative and the maximum pressures vary from 200 to 400 p.s.i.g. for molar ratios varying from 5:1 to 20:1 propylene oxide to tri-acid at 190° C. The highest pressure was 400 p.s.i.g. at 200° C. With butylene oxide the vapor pressure was considerably lower. In general, the most satisfactory method of preparing the tris(hydroxy-terminated)polyhydrocarbon cross-linking agent of the present invention is heating propylene oxide with the Empol 1040 at a temperature of 180° C. for a period of six hours in a molar ratio of 15 to 1 propylene oxide to Empol 1040 in an autoclave that can withstand the pressure of 350 p.s.i.g. The triol cross-linking agent may also be prepared by heating 1,2-butylene oxide with the Empol 1040 at the same temperature for the same period of time with the pressure diminished to 210 p.s.i.g.

The structure of the tris(hydroxy-terminated)polyhydrocarbon obtained by the reaction of Empol 1040 with propylene oxide may be represented as follows:

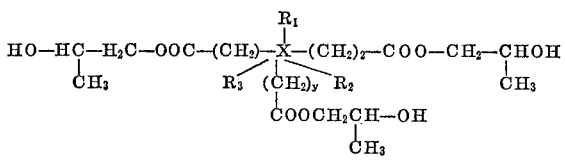

In the above formula $R_1$, $R_2$ and $R_3$ are believed to be alkyl side chains and X are linkages resulting from the polymerization of 3 unsaturated fatty acid molecules. The molecular weight of the triol when the alkylene oxide is 1,2-butylene oxide was found by hydroxyl determination to be 1260 and by the vapor phase Osmometer determination to be about 1130.

To obtain the binders according to the present invention for the castable propellants of the present invention, the hydroxy telechelic polymer, e.g. the hydroxy-terminated polybutadiene and the tris(hydroxy-terminated) polyhydrocarbon, are admixed with a diisocyanate, preferably toluene diisocyanate. This binder composition readily cures to produce elastomeric binders suitable for use in the formation of castable propellants.

According to the present invention therefore, there is provided an elastomeric binder for use in forming a castable propellant comprising (a) a hydroxyl telechelic polymer and (b) a triisocyanate or (c) a tris(hydroxy-terminated)polyhydrocarbon which is the reaction product of a tris(carboxyl-terminated)hydrocarbon and a mono-epoxide such as an alkylene oxide selected from propylene oxide and 1,2-butylene oxide as cross-linking agent and a diisocyanate preferably tolylene diisocyanate as curing agent.

To form the castable propellant of the present invention, the above binder before curing thereof, is suitably admixed with finely divided ammonium perchlorate as oxidizer, preferably comprising a mixture of equal weights of ammonium perchlorate of particle size 400 microns and 200 microns, and finely divided aluminum as fuel, preferably of the spherical type having a particle size of 12 microns. For high temperature applications, the ammonium perchlorate may be substituted with potassium perchlorate. The propellant so obtained preferably should suitably have a minimum of 80% solid loading and more preferably 84% solid loading. The weight ratio of perchlorate to aluminum can range from 70:30 to 90:10. To facilitate mixing of the binder with the solids to produce the solid propellant with an 84% solid load, the binder desirably includes a plasticizer such as bis(2-ethylhexyl) azelate, suitably in an amount from 10 to 20%, which leaves the viscosity of the paste fused. A high percentage by weight of the plasticizer usually lowers the tensile strength of the propellant.

Thus, to prepare the castable propellant according to the present invention the binder is prepared by mixing the hydroxy telechelic polymer e.g. hydroxy-terminated polybutadiene, the tris(hydroxy-terminated)polyhydrocarbon, the plasticizer and the diisocyanate and the mixture is stirred into a homogeneous liquid. The solids, i.e., the finely divided ammonium perchlorate and finely divided aluminum, are carefully blended preferably in an optimum weight ratio of perchlorate to aluminum of 82:18 for good mixing and high solid loading. The binder mixture was subsequently added to the blend of the solids and stirred under vacuum in a resin pot. With an 80% solid load, room temperature mixing was adequate but with an 84% solid load, a temperature of 50 to 60° C. was preferable to increase fluidity. After mixing, the propellant mix may be poured into Teflon trays (Teflon is a Du Pont trademark for polytetrafluoroethylene) and cured at 60° C. for about 3 days. When it is desired to substantially reduce the pot life and curing time of the binder, small amounts, suitably up to 0.2% and preferably up to 0.047% by weight, of a curing catalyst such as ferric acetyl acetonate, may be present. Thus, the pot life of the binder and the resultant propellant can be varied considerably by adjusting the level of the catalyst. Additionally the reactivity can be brought to a level where is is possible to process the binder with the same equipment as used normally in the production of polyurethane and thus the binder of the present invention eliminates the long cure and resulting drawbacks of tied up facilities experienced with the use of carboxyl-terminated polybutadienes in the binder system. Further, the binder system of the present invention has the advantage of using readily available materials which are transformed quantitatively and easily without going through an aqueous system.

The physical properties of the binder and propellant are similar to those of the known MAPO-epoxide system and the mechanical properties of the binder system can be much improved, especially at low temperature, by incorporating a small amount of a wetting agent to increase the bonding between the particulate solids and the elastomeric binder. A compatible wetting agent is a polymer made from N-methyldiethanolamine and sebacic acid supplied under the trademark Polymer N-8, suitably in an amount from 0.3 to 0.8 percent by weight. When propellants with more than 80% of solid loading are required, process mixing facilities should be used to obtain the 84% solid level and this may be accomplished by using similar processes as with high solid polyurethanes. With the plasticizer and binder of the present invention and in the absence of a catalyst, at room temperature the pot life of the binder was found to exceed one day. After curing at 60° C. for three days, an elastomeric binder was obtained which is clear, free of bubbles or voids, and flexible in a Dry Ice acetone bath at −78° C.

The final properties one wishes to obtain in a solid propellant are dependent on the end use of the propellant as exemplified in Ind. Eng. Chem., vol. 52, pp. 776–780, 1960. Some applications require high elongation (over 40%) and strength at maximum stress (over 80 p.s.i. at room temperature).

To assess the properties of the propellant, the mechanical properties of the elastomeric binder according to a preferred embodiment of the present invention were measured. In particular, the conditions of formation of the binder i.e. the properties of the ingredients; the curing temperature, the time of curing, the concentration of plasticizer and the catalyst level were tested.

In the formation of the elastomeric binder the materials were as follows:

Hydroxyl-terminated polybutadiene (PBBO)

The diol was prepared by reacting carboxyl-terminated polybutadiene (Thiokol HC-434) with 1,2-butylene oxide (BO). Its molecular weight was found by hydroxyl group determination and saponification to be 3400.

Tris-hydroxyl hydrocarbon (EM-1040-BO)

This material was made by the reaction of a tricarboxylic acid (Empol-1040 sold by Emery Industries, Inc.) and 1,2-butylene oxide. Its molecular weight as determined by the hydroxyl content was found to be 850.

Tolylene-diisocyanate (TDI)

The diisocyanate was 2,4-tolylene diisocyanate sold by du Pont under the trademark of Hylene T-2,4 and was used without further purification.

Plasticizer

The plasticizer used was bis(2-ethylhexyl)azelate (DEHA) and was incorporated in the mixtures without purification.

General procedure for the preparation of elastomeric binders

The diol (PBBO), the triol (EM-1040-BO), the plasticizer (DEHA) and TDI were mixed under a vacuum (one mm. Hg) over a ten minute period. The degassed homogeneous mixture was then poured into Teflon trays and cured in an oven at 60° C. for 7 days or 100° C. for 2 days. When the resin mixture was cured into a rubbery sheet (0.1 inch thick), the elastomer was removed from the trays and the mechanical properties determined.

Mechanical tests

The determinations of tensile strength, elongation and modulus were carried out on die-cut rings having an inner diameter of 1.248 inches and an outer diameter of 1.495 inches at ambient temperature (73° F.). The test specimens were strained at the rate of 5 inches per minute. The maximum tensile strength ($\sigma_m$), the elongation at maximum stress ($\epsilon_m$) and the modulus at maximum stress ($E_m$) were evaluated. The various proportions of reactants used together with the mechanical parameters measured are given in the following Tables I to IV and shown graphically in FIGS. 14 to 27.

A number of parameters have been considered to describe a three dimensional network. Theoretically, gelation starts when the degree of branching ($\alpha$) exceeds 0.5. The most significant value of degree of branching concerning binder and propellant properties is attained when polymerization is complete. In this case $\alpha$ will be equal to unity in the following formula:

$$\alpha_f = \frac{\rho_t}{1 - R\rho_d} \text{ for } R < 1.0$$

where $\alpha_f$ is the ultimate degree of branching, R is the ratio of equivalents of isocyanate to hydroxyl groups in the starting mixture, $\rho_t$ is the equivalent fraction of hydroxyl in the triol to the total hydroxyl groups in the original mixture and $\rho_d$ is the equivalent ratio of hydroxyl in the diol to the total hydroxyl groups. Since PBBO is about 95 percent difunctional and EM-1040-BO is 90 percent trifunctional, $\rho_t$ and $\rho_d$ are easily calculated in the uncured mixture. Due to the presence of the monofunctional units present in both the diol and triol, it requires an excess of triol to obtain gelation at the stoichiometric ratio of isocyanate to hydroxyl groups. The other parameter, which has a major influence on the mechanical properties, is the average chain length between branch units ($M_c$). It is obtained from the following equation:

$$M_c = \frac{2RE_1 + (1-\rho_t)E_{DO} + \rho_t E_t}{\rho_t}$$

where $E_1$ is the equivalent weight of diisocyanate, $E_{DO}$ the equivalent weight of diol and $E_t$ the equivalent weight of triol. The best elastomeric properties are obtained with high $M_c$ provided that the diol is highly difunctional and does not contain monofunctional molecules which act as chain extension stoppers. A high $M_c$ also implies the use of a high molecular weight diol. This property can only be obtained by an increase in viscosity of the uncured mixture.

Curing temperature

The temperature at which chain extension and cross-linking are taking place has a large influence on the mechanical behavior of the elastomers. Two sets of curing experiments were made at 60 and 100° C. The results are recorded in Tables I to IV for various proportions of ingredients. It may be seen (FIGS. 14 to 27) that, in general, the modulus ($E_m$) was higher at 100° C. but the elongation and tensile strength were superior at 60° C.

Time of curing

The duration of curing is a very difficult parameter to study because it depends on the composition of the formulation and the temperature. For this reason, the time of curing was kept constant and was taken as 24 hours at 100° C. or 6 days at 60° C.

Effects of isocyanate-to-hydroxyl ratio (R)

Figure 14:
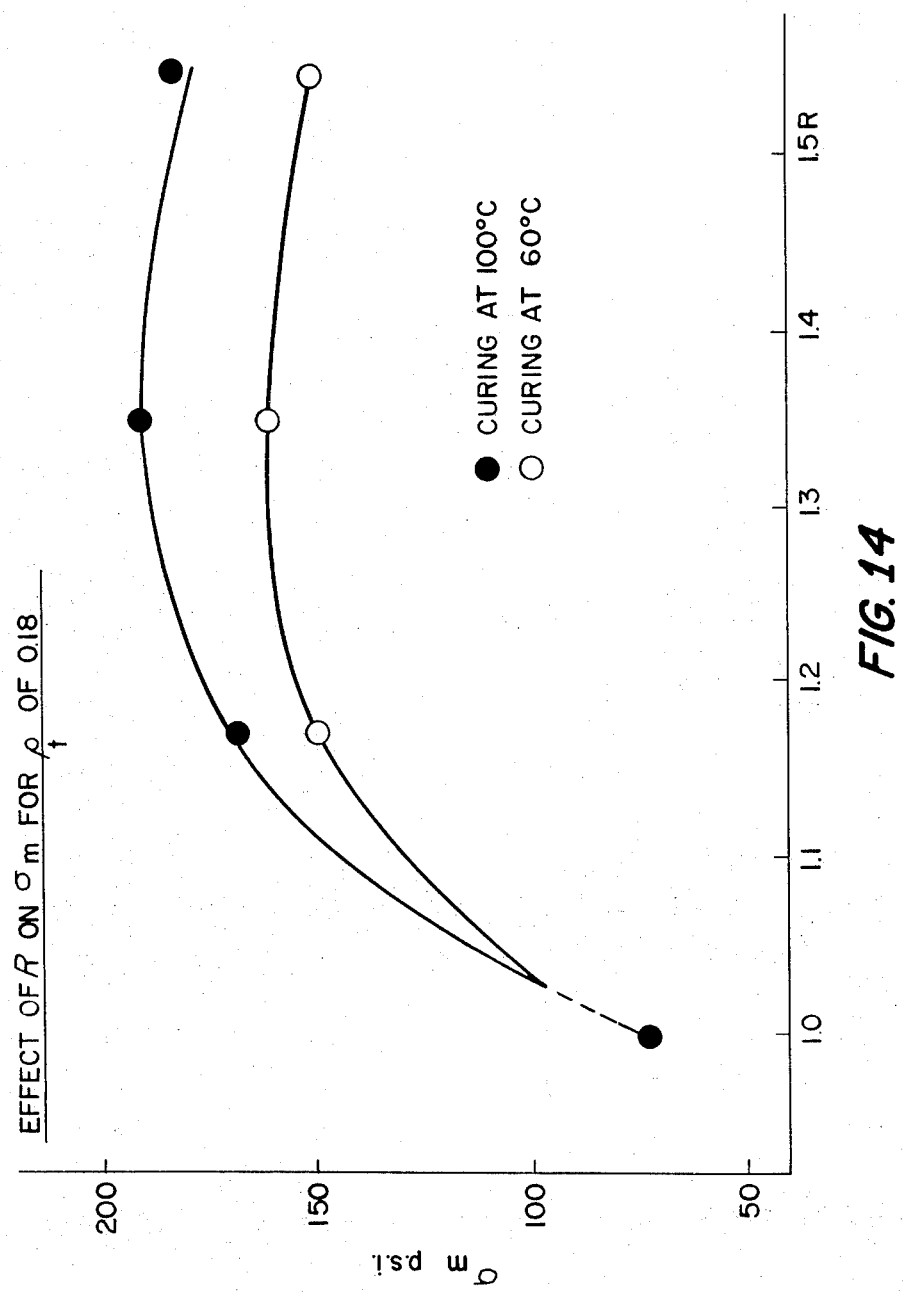
FIGS. 14–27 are graphs showing the effects of various proportions of reactants on the mechanical properties of the elastomeric binders of the present invention.
Figure 15:
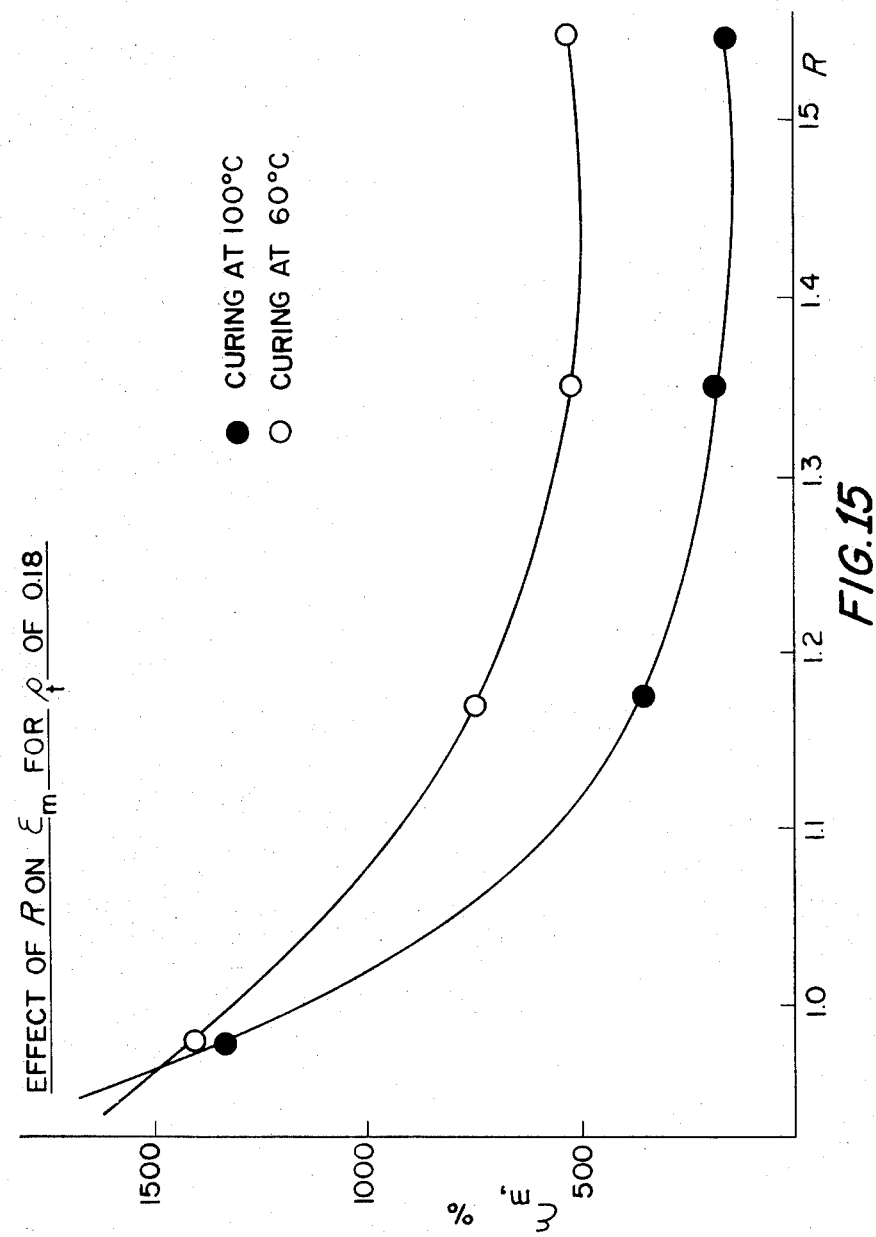
Figure 16:
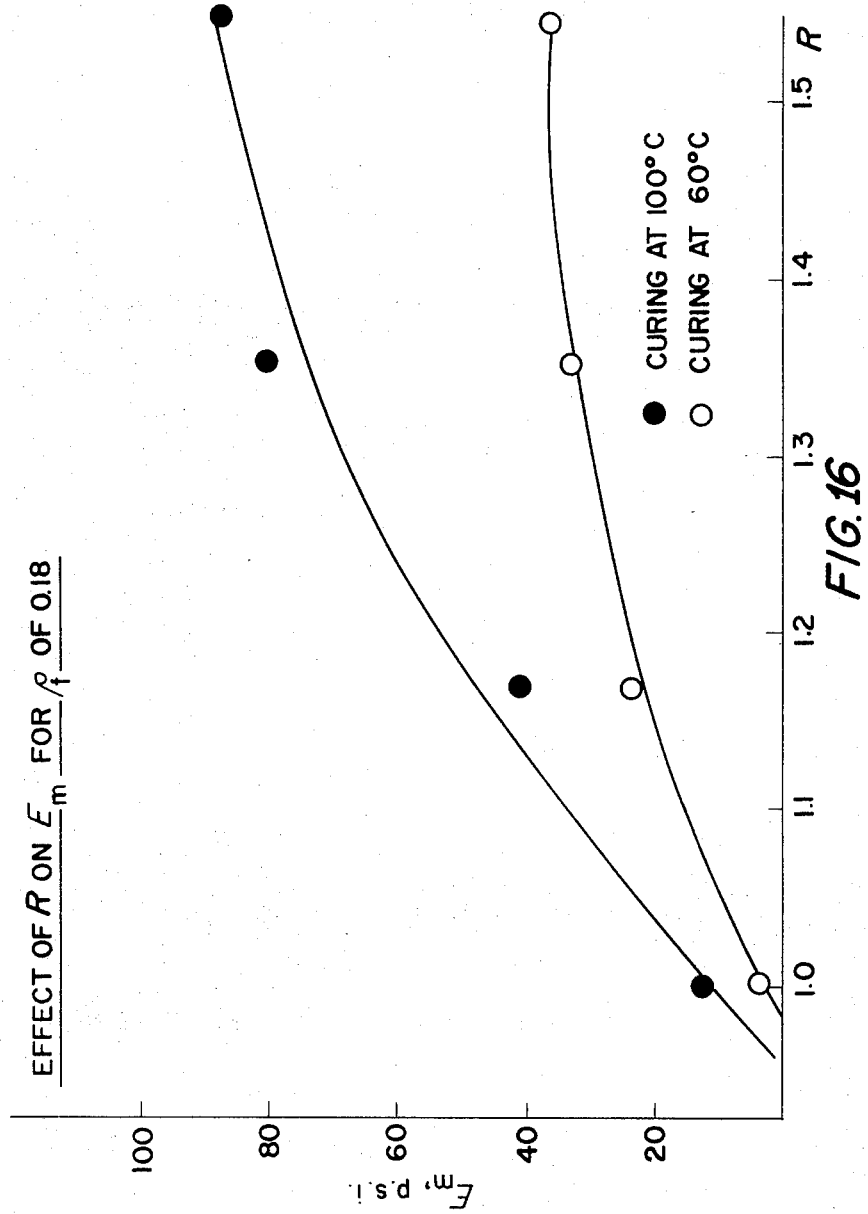

The equivalent ratio of isocyanate to total hydroxyl content in the starting mixture was varied from 0.8 to 1.5. The results are given in Table I. The modulus at maximum lead increased from a nil value to an approximate maximum of 85 to 40 p.s.i. at respective temperatures of 100° C. and 60° C. for a constant concentration of triol ($\rho_t$). Since the formulations containing lower concentrations of cross-linking agent are more sensitive to changes of stoichiometric ratios of isocyanate to hydroxyl groups, a low concentration of triol ($\rho_t$) was chosen. It was set at 0.18 on the basis of the analysis of the triol. Typical preparations which led to elastomers are shown in Table I. When R was close to 1.0, the materials obtained were very weak and undercured. The results for such formulations are illustrated in FIG. 14, 15 or 16. It was found that when R was increased while $\rho_t$ was kept constant at 0.18, the maximum tensile strength reached a maximum at an R ratio of 1.3 (FIG. 14), and the elongation at maximum stress decreased gradually with increasing R (FIG. 15). Both $\sigma_m$ and $\epsilon_m$ had higher values for a curing temperature of 60° C. The modulus at maximum stress ($E_m$) was also observed to increase with higher isocyanate to hydroxyl ratios; the elastomer obtained became progressively harder with a large excess of isocyanate in FIG. 16.

Even if $\sigma_m$ reached a maximum value for R equal to 1.3, the elongation at this ratio was assumed to be too low. It is a common observation in the elastomer field that optimum mechanical properties are not attained when R is equal or close to 1, but they do occur when R is greater than one, as with polyurethanes. In some other cases, where the binder has some interaction with a solid, good physical properties might be attained with a deficiency of isocyanate.

The effect of isocyanate-to-hydroxyl ratio on the elongation, ultimate tensile strength and modulus was more pronounced near the stoichiometric ratio. An excess of TDI improved the modulus and ultimate tensile strength but reduced the elongation.

Effect of triol-to-total hydroxyl ratio ($\rho_t$)

The effect of triol content (EM-1040-BO) in a system where the isoclyanate to hydroxyl ratio was 1.0, was studied in terms of mechanical properties. One of the parameters influencing the structure of elastomers and their mechanical properties is the degree of cross-linking induced by the triol. Because hydroxyl-terminated polybutadiene (PBBO) is more than 95 percent difunctional, it cannot lead to an elastomer by reaction with TDI alone. Significant amounts of triol are necessary to cause gelation and formation of a rubbery material. Moreover, the triol used (EM-1040-BO) is made by reacting Empol-1040 tri-acid with 1,2-butylene oxide. This acid is produced by polymerization of unsaturated $C_{18}$ fatty acids and is essentially a mixture of tribasic (90 percent), dibasic (5 percent) and monobasic (5 percent) acids. The triol (EM-1040-BO) would contain the same degree of functionality.

Figure 17:
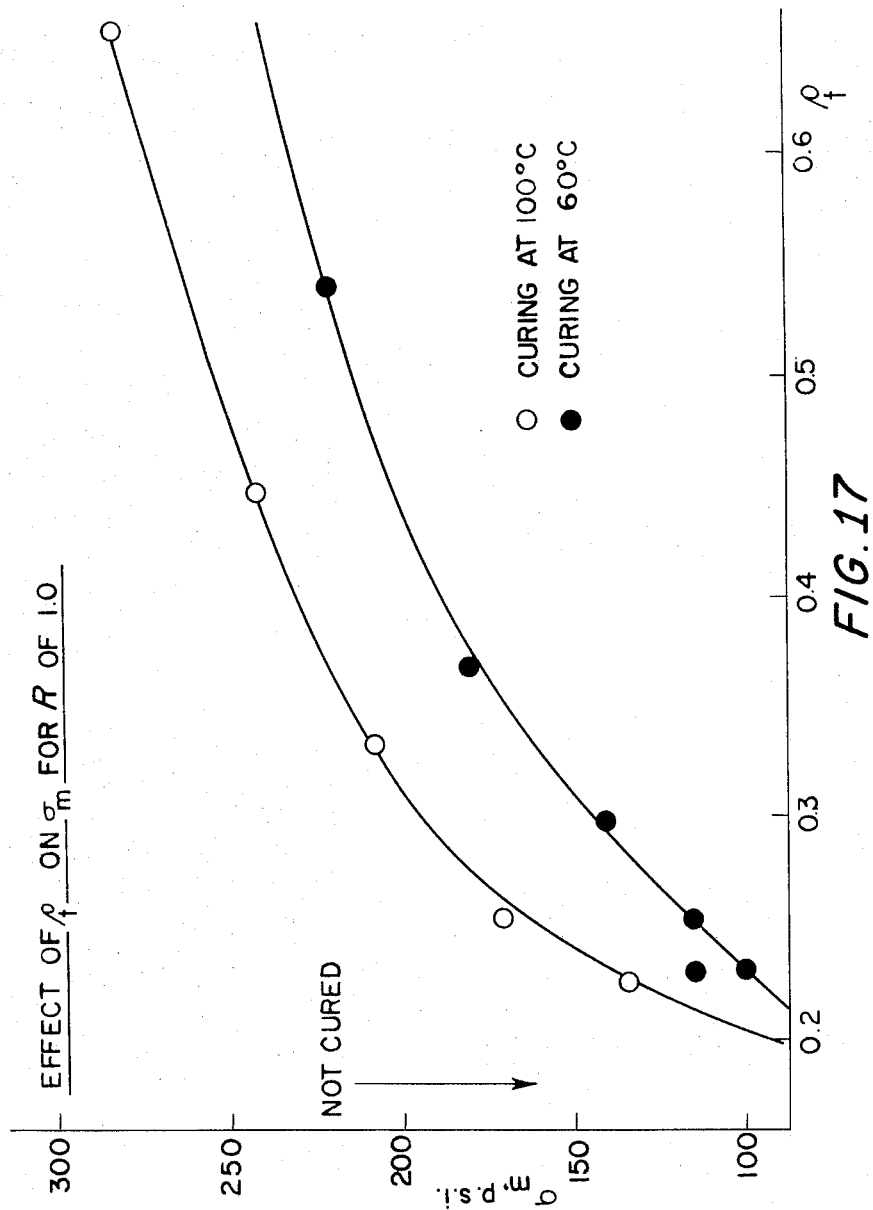
Figure 18:
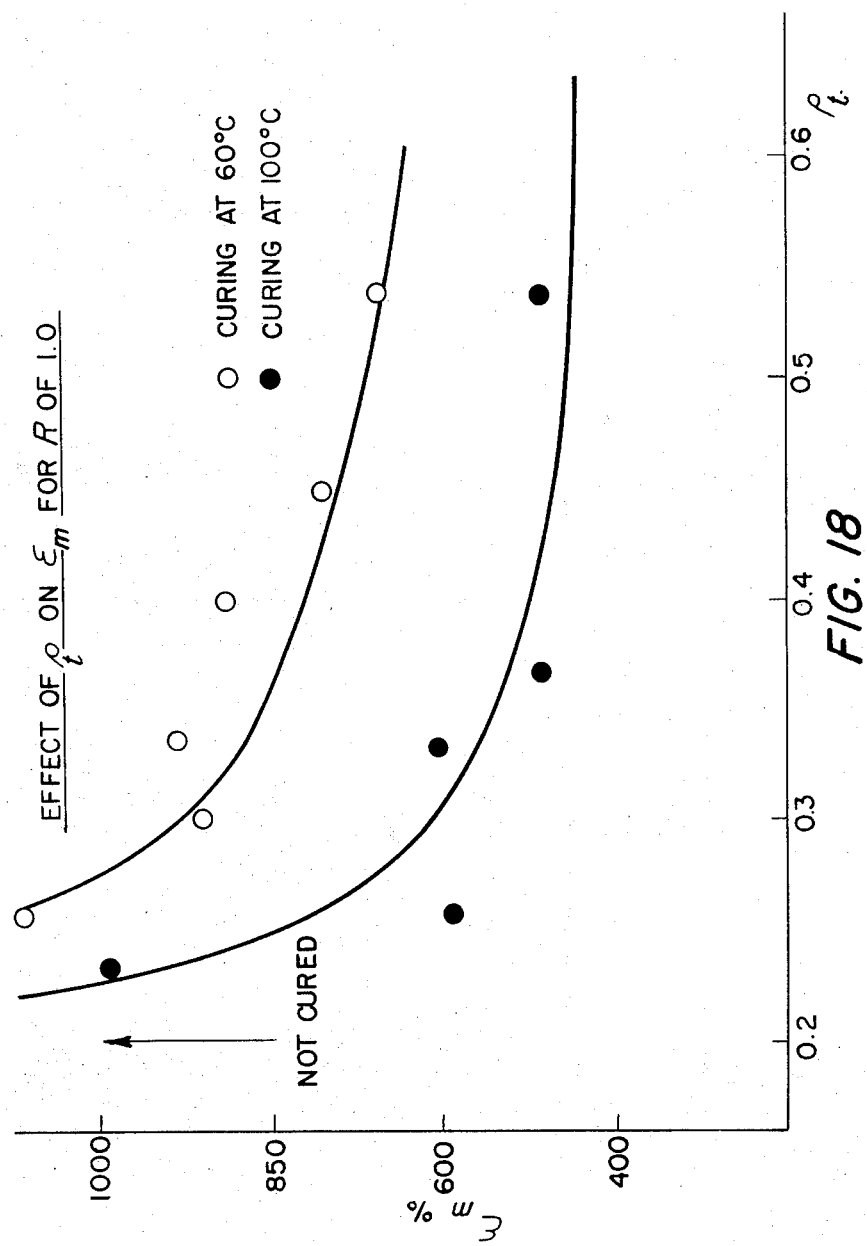
Figure 19:
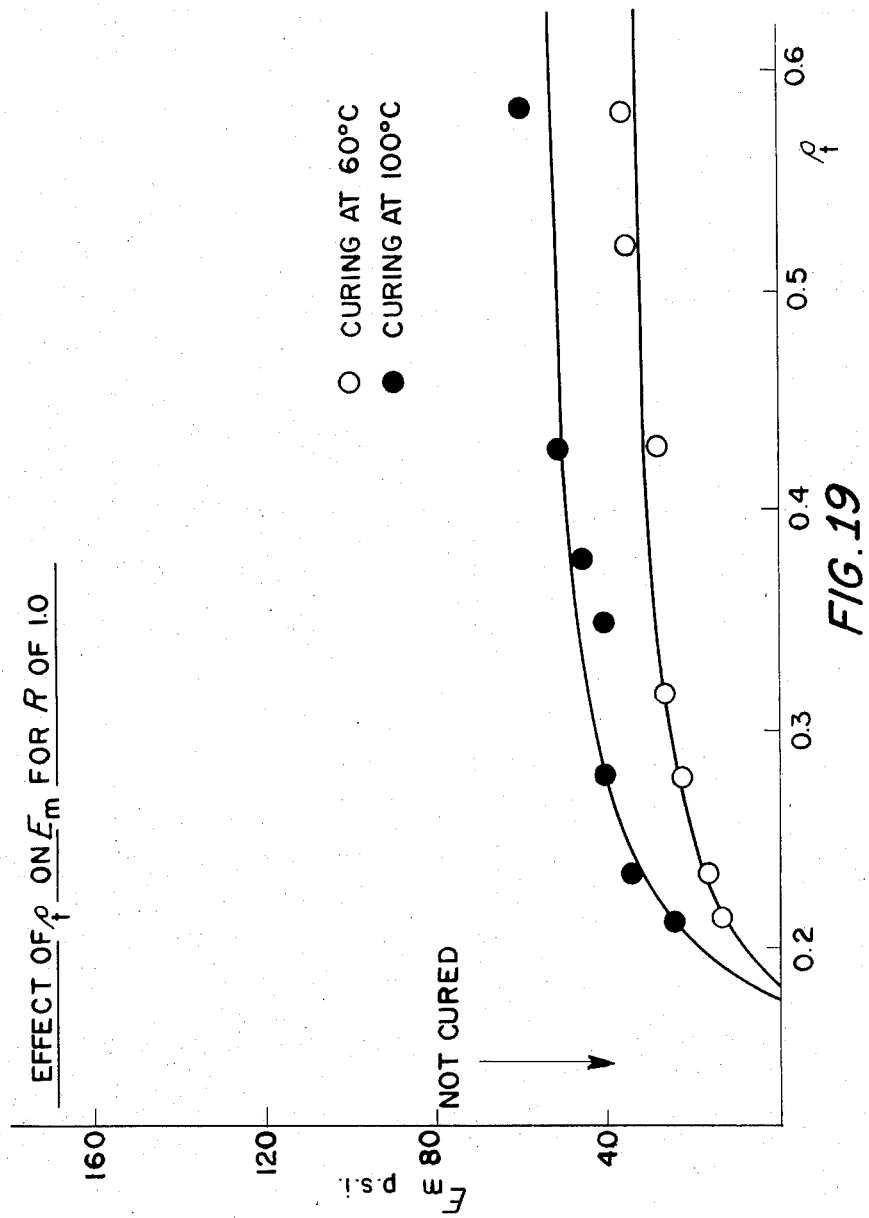
Figure 20:
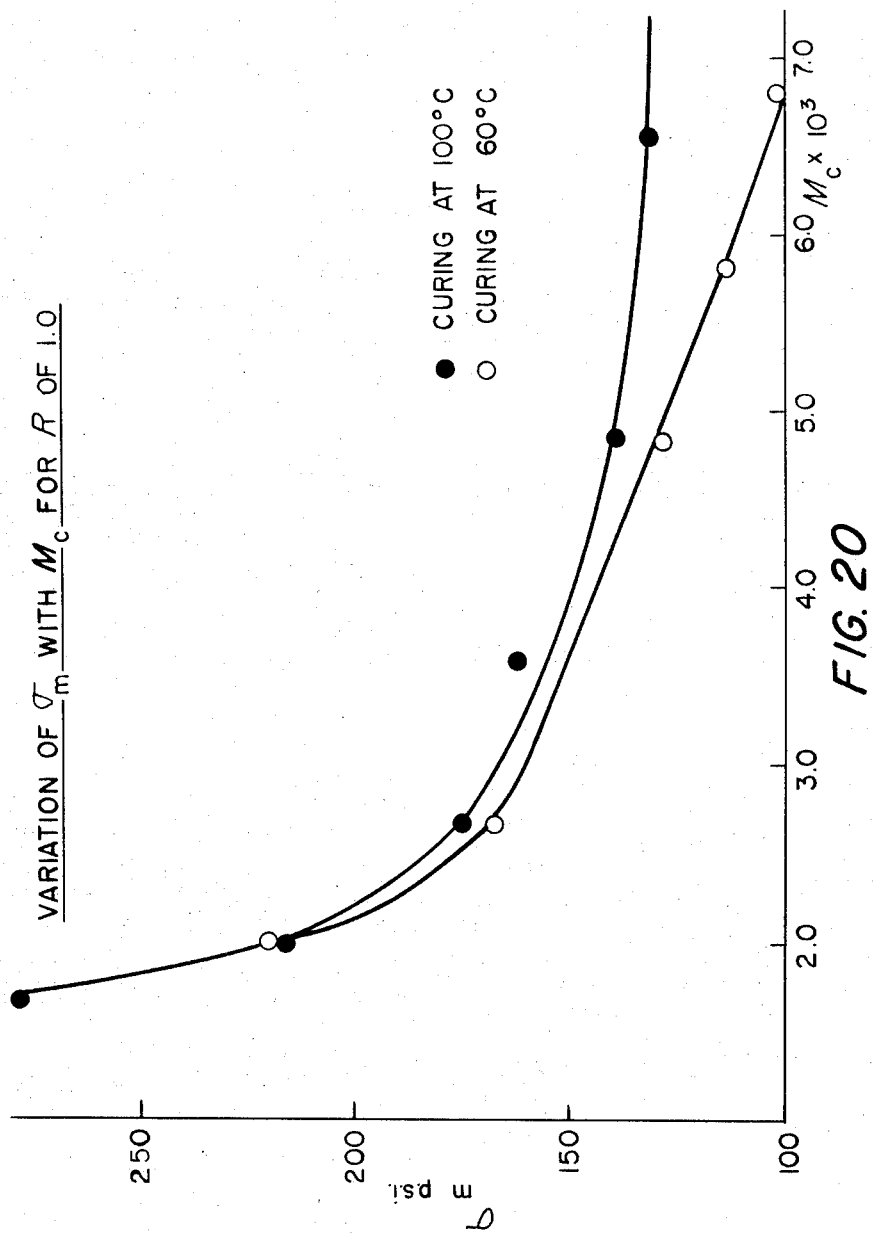
Figure 21:
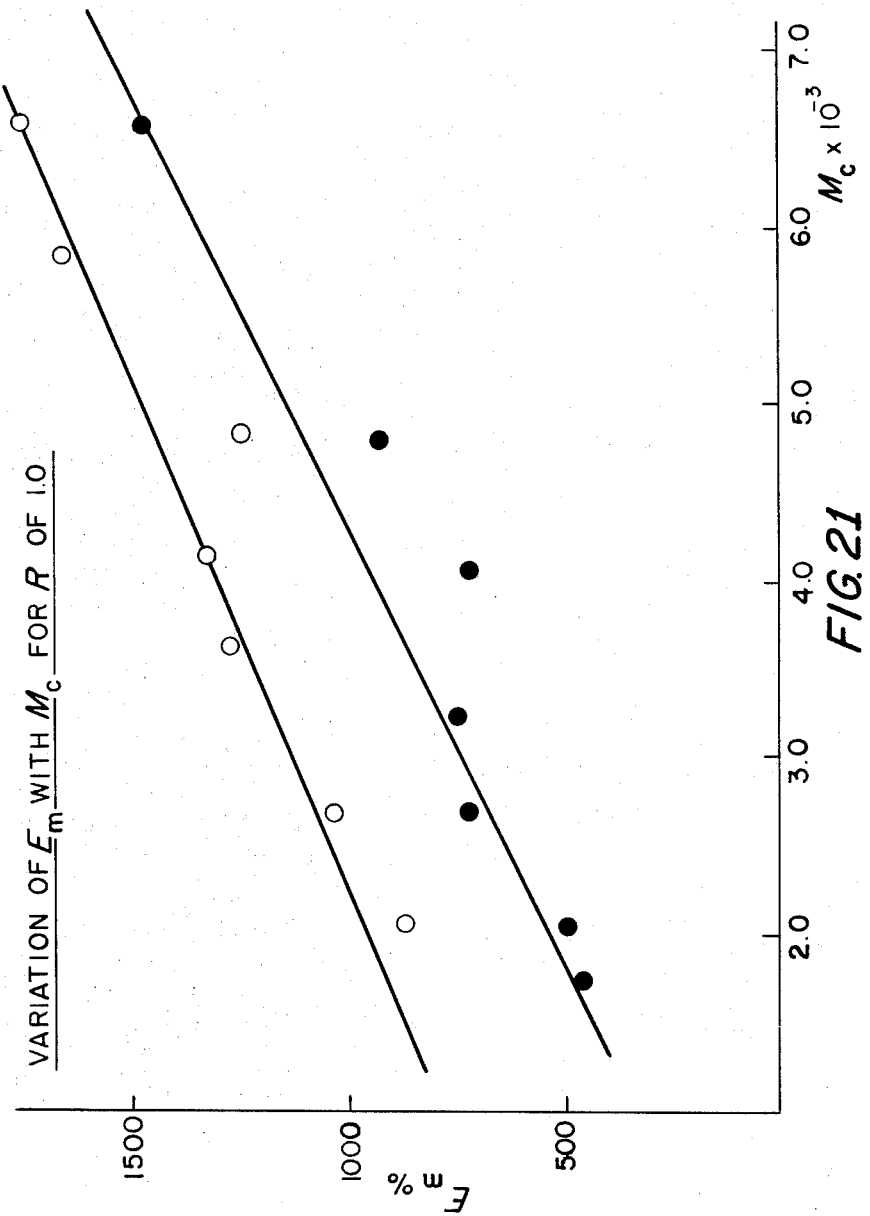
Figure 22:
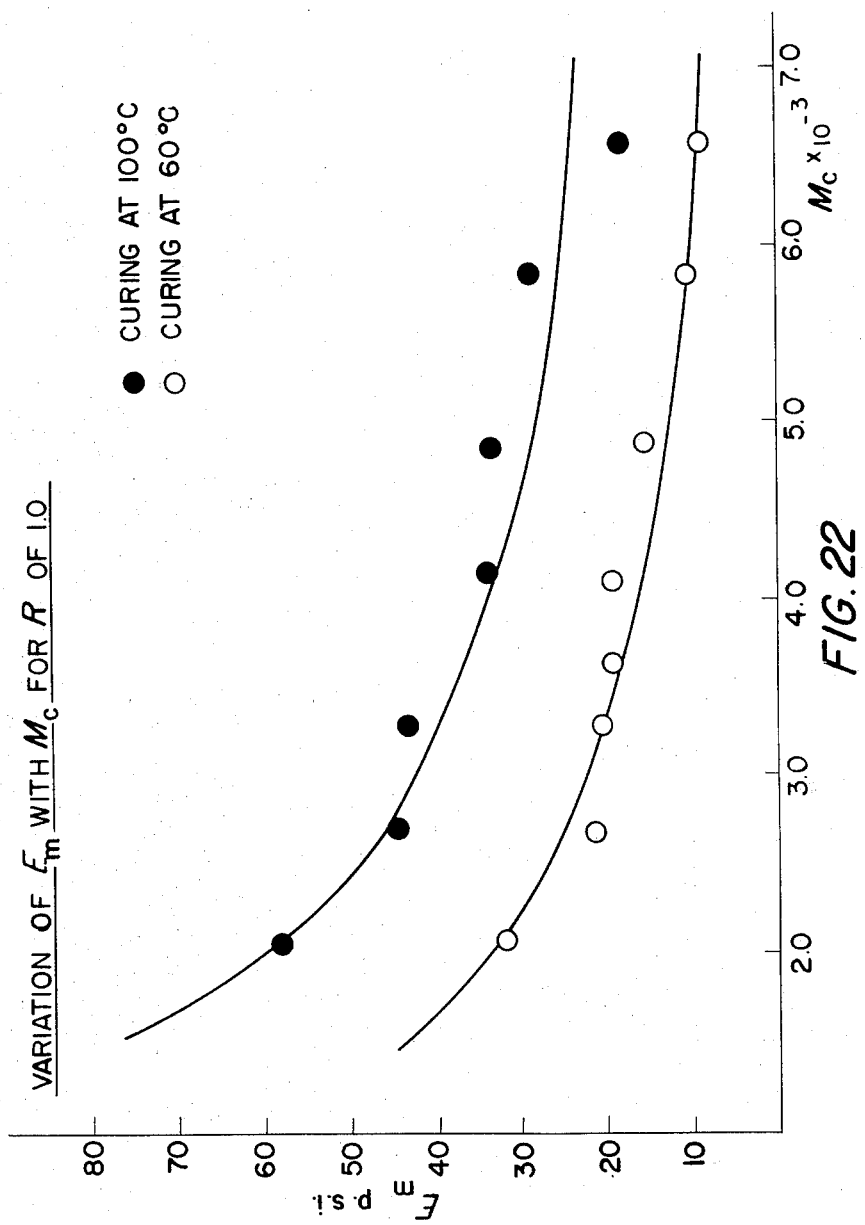
Figure 23:
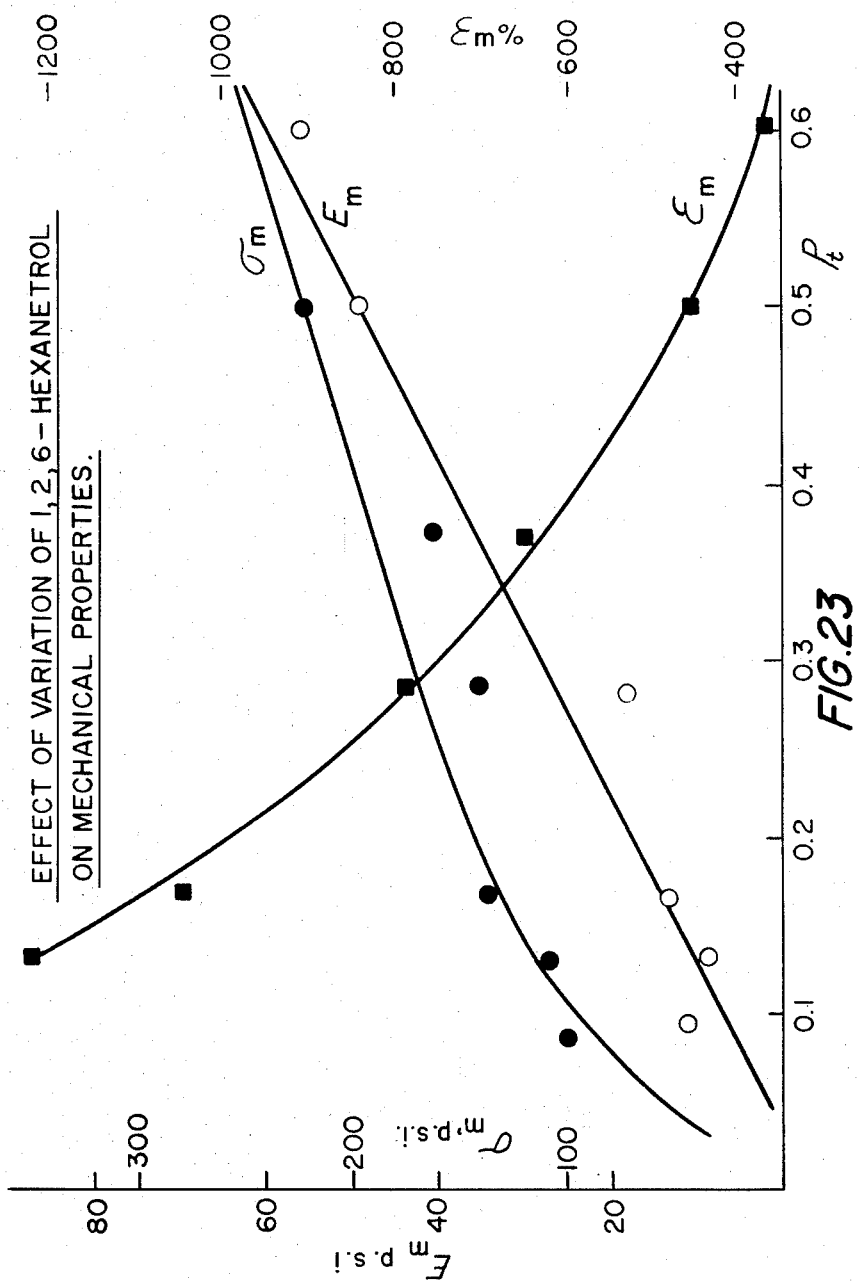
Figure 24:
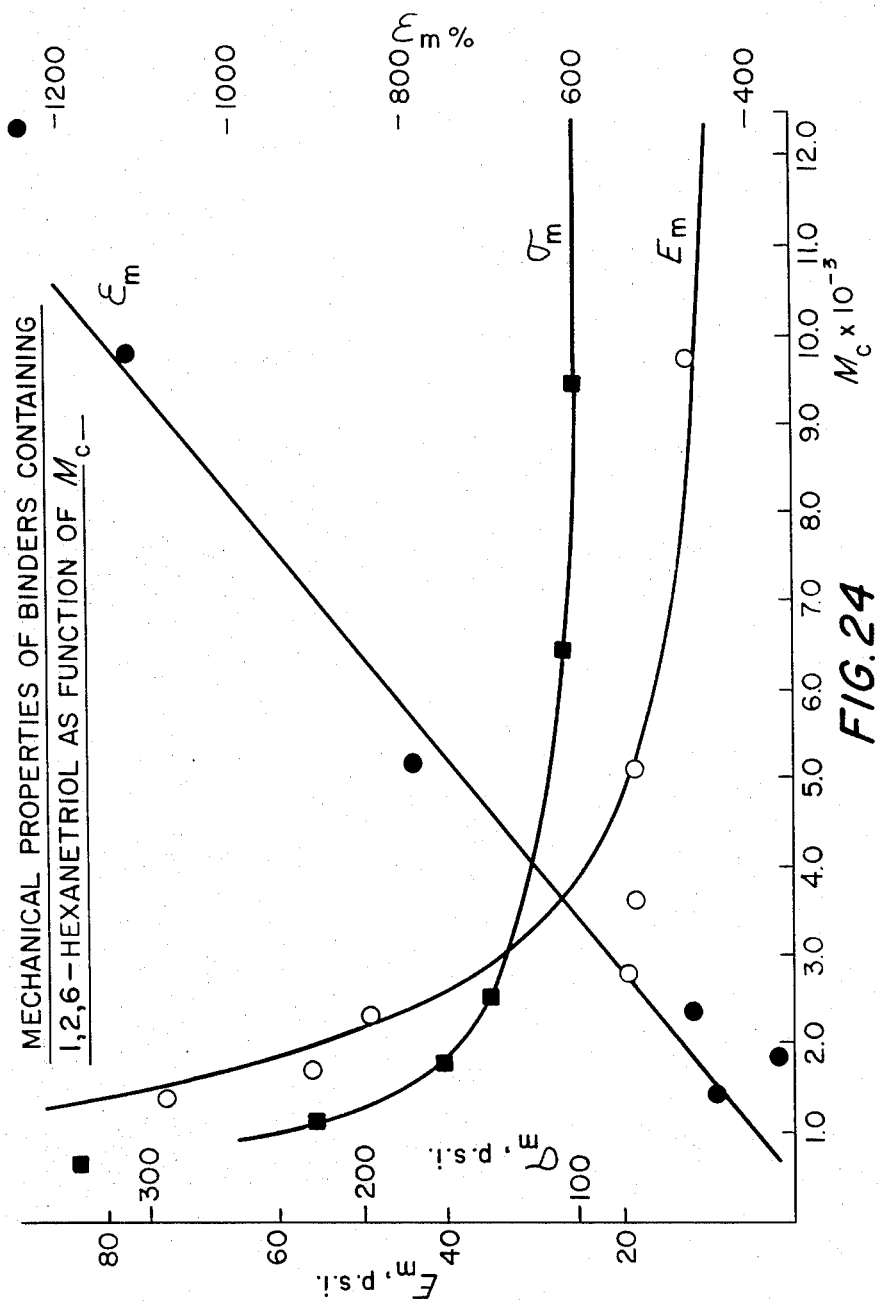

Table II gives the mechanical properties of binders obtained by varying the proportions of EM-1040-BO triol at an R ratio of 1.0, and the results are represented graphically in FIGS. 17, 18 and 19 for $\sigma_m$, $\epsilon_m$ and $E_m$ as a function of $\rho_t$. A proportion of triol greater than 0.2 was necesary to cause gelation. Below this level of triol, an uncured elastomer resulted. If an excess of TDI was used, however, an elastomer was obtained because of the cross-links induced by excess of isocyanate.

In FIGS. 17, 18 and 19, increasing the triol content in the mixture gave rise to elastomers of greater strength, lower elongation and higher modulus. It should be emphasized that these mechanical properties tend to level off with the increase of triol at an R ratio of 1.0. The same trend was observed at both curing temperatures of 60 and 100° C.

If one consider the effect of $M_c$ on elongation, one sees that better elastomeric properties were obtained at higher $M_c$ or low concentration of cross-links. The influence of $M_c$ on $\sigma_m$ (FIG. 20), and $\epsilon_m$ (FIG. 22) is in agreement with the properties of amorphous polymers of low intermolecular attractions.

Effect of the molecular weight of triols

A high molecular weight triol is usually preferred as cross-linking agent for polyurethane because the viscosity of linear polymers is reduced by branched polymer and a better control on the building of the network is obtained. High molecular weight trifunctional units will lead to greater elasticity due to a large $M_c$. Binders used in the manufacture of composite propellants usually contain such trifunctional polymers as exemplified by polyurethane propellants.

Alternatively low molecular weight triols are also favored because they confer toughness to elastomers by reducing $M_c$. There is a preferential reaction of isocyanate with short chain triols because of their primary hydroxyl functions. Therefore, 1,2,6-hexane triol was investigated in the polybutadiene system. The condition used and the results obtained are given in Table III. At low concentrations, 1,2,6-hexane triol is soluble in PBBO but there is a rapid reaction of this triol with isocyanate occurring which favors the bunching of chain ends. At high concentrations of 1,2,6-hexane triol, the elastomers had a milky appearance.

A comparison of the properties obtained with the use of triol EM-1040-BO (FIGS. 17, 18, 19) and 1,2,6-hexane triol (FIG. 23) shows that elastomers cross-linked with a short chain triol are slightly stronger and less extensible. Experimental results showed that 1,2,6-hexane triol (FIG. 24) was inferior to some extent to triol EM-1040-BO (FIGS. 20, 21, 22) if $\sigma_m$, $\epsilon_m$ and $E_m$ were correlated with $M_c$. At a constant value of $M_c$, the mechanical properties were slightly superior to the properties obtained with EM-1040-BO.

The small change in mechanical properties observed by using a short chain triol is difficult to explain. It would be expected that, if the network were made up of short links between the main polybutadiene backbone, the mechanical strength of the elastomers would be much improved. High molecular weight triols would result in a softer elastomer. This anomalous behavior is probably due to the fact that PBBO is not entirely difunctional. The monofunctionality of EM–1040–BO (5%) will prevent the building of a high molecular weight network by way of chain stopping.

Effect of plasticizer on elastomer properties

The addition of a plasticizer (DEHA) to a polybutadiene system is essential to facilitate mixing of the binder ingredients with solids. Moreover, the glass transition temperature of the plasticized elastomers is always reduced by several degrees because of less interaction between the polymer chain as is the case with polyurethanes. By varying the proportions of plasticizer (Table IV), both tensile strength (FIG. 25) and modulus (FIG. 27) were decreased by the addition of DEHA, but the elongation dropped only slightly (FIG. 26).

TABLE I.—EFFECT OF NCO/OH RATIO ON MECHANICAL PROPERTIES

[PBBO, 85 g. (0.05 eq.); EM–1040–BO, 3.7 g. (0.0125 eq.); $\rho_t$=0.18]

| TDI | | Curing temp., °C. | R NCO/OH | $\sigma_m$, p.s.i. | $\epsilon_m$, percent | $E_m$, p.s.i |
|---|---|---|---|---|---|---|
| G. | Eq. | | | | | |
| 4.3 | 0.050 | 60 | 0.080 | | (1) | |
| 5.4 | 0.062 | 60 | 1.0 | >72 | >1,390 | >5.2 |
| 6.2 | 0.071 | 60 | 1.1 | 169 | 750 | 22.5 |
| 7.0 | 0.080 | 60 | 1.3 | 191 | 521 | 36.6 |
| 7.8 | 0.090 | 60 | 1.4 | 184 | 559 | 32.8 |
| 4.3 | 0.050 | 100 | 0.8 | | (2) | |
| 5.4 | 0.0625 | 100 | 1.0 | 181 | 1,330 | 13.6 |
| 6.2 | 0.071 | 100 | 1.1 | 150 | 358 | 42.1 |
| 7.0 | 0.080 | 100 | 1.3 | 161 | 199 | 82.3 |
| 7.8 | 0.090 | 100 | 1.4 | 153 | 175 | 86.6 |

[1] Very weak.
[2] Too soft.

TABLE II.—EFFECT OF THE AMOUNT OF TRIOL (EM–1040–BO) ON MECHANICAL PROPERTIES

[PBBO, 85 g. (0.05 eq.); R:1.0]

| EM–1040–BO | | TDI | | Curing temp., °C. | $\rho_t$ | $M_c$, $10^{-3}$ | $\sigma_m$, p.s.i. | $\epsilon_m$, percent | $E_m$, p.s.i. |
|---|---|---|---|---|---|---|---|---|---|
| G. | Eq. | G. | Eq. | | | | | | |
| 5.2 | 0.017 | 5.9 | 0.0675 | 60 | 0.23 | 6.6 | 100 | 1,130 | 8.8 |
| 6.0 | 0.020 | 6.1 | 0.070 | 60 | 0.26 | 5.9 | 114 | 1,096 | 10.6 |
| 7.5 | 0.025 | 6.5 | 0.075 | 60 | 0.30 | 4.8 | 140 | 874 | 16.0 |
| 9.0 | 0.030 | 7.0 | 0.080 | 60 | 0.36 | 4.1 | 184 | 912 | 20.2 |
| 10.5 | 0.035 | 7.4 | 0.085 | 60 | 0.37 | 3.6 | 180 | 893 | 20.2 |
| 12.0 | 0.040 | 7.8 | 0.090 | 60 | 0.40 | 3.3 | 179 | 855 | 21.0 |
| 15.0 | 0.050 | 8.7 | 0.10 | 60 | 0.45 | 2.7 | 169 | 770 | 22.0 |
| 22.5 | 0.075 | 10.9 | 0.12 | 60 | 0.54 | 2.0 | 220 | 688 | 31.9 |
| 30.0 | 0.10 | 13.0 | 0.15 | 60 | 0.60 | 1.7 | 149 | 796 | |
| 5.2 | 0.017 | 5.9 | 0.067 | 100 | 0.23 | 6.6 | 134 | 990 | 18.4 |
| 6.0 | 0.020 | 6.1 | 0.070 | 100 | 0.26 | 5.9 | 171 | 594 | 28.8 |
| 7.5 | 0.025 | 6.5 | 0.075 | 100 | 0.30 | 4.8 | 141 | 712 | 34.4 |
| 9.0 | 0.030 | 7.0 | 0.080 | 100 | 0.34 | 4.1 | 206 | 609 | 33.7 |
| 10.5 | 0.035 | 7.4 | 0.085 | 100 | 0.37 | 3.6 | 166 | 591 | 33.5 |
| 12.0 | 0.040 | 7.8 | 0.090 | 100 | 0.40 | 3.3 | 177 | 622 | 28.5 |
| 15.0 | 0.050 | 8.7 | 0.10 | 100 | 0.45 | 2.7 | 241 | 621 | 38.8 |
| 22.5 | 0.075 | 10.9 | 0.12 | 100 | 0.54 | 2.0 | 219 | 497 | 44.0 |
| 30.0 | 0.10 | 13.0 | 0.15 | 100 | 0.60 | 1.7 | 281 | 487 | 57.6 |

TABLE III.—EFFECT OF 1,2,6-HEXANE TRIOL ON MECHANICAL PROPERTIES

[PBBO=85 g. (0.05 eq.); R:1.0]

| 1,2,6-hexane triol | | TDI | | Curing temp., °C. | $\rho_t$ | $M_c$, $\times 10^{-3}$ | $\sigma_m$, p.s.i. | $\epsilon_m$, percent | $E_m$, p.s.i. |
|---|---|---|---|---|---|---|---|---|---|
| G. | Eq. | G. | Eq. | | | | | | |
| 0.22 | 0.0050 | 4.8 | 0.055 | 100 | 0.091 | 49 | 102 | 955 | 10.4 |
| 0.33 | 0.0075 | 5.0 | 0.057 | 100 | 0.13 | 13 | 108 | 1,240 | 8.7 |
| 0.44 | 0.010 | 5.2 | 0.060 | 100 | 0.17 | 9.8 | 140 | 1,110 | 12.6 |
| 0.90 | 0.020 | 6.1 | 0.070 | 100 | 0.28 | 5.1 | 142 | 785 | 18.1 |
| 1.34 | 0.030 | 7.0 | 0.080 | 100 | 0.37 | 3.6 | 162 | 890 | 18.2 |
| 1.78 | 0.040 | 7.8 | 0.09 | 100 | 0.44 | 2.8 | 196 | 1,000 | 19.4 |
| 2.23 | 0.050 | 8.7 | 0.10 | 100 | 0.50 | 2.3 | 222 | 461 | 49.1 |
| 3.35 | 0.075 | 10.9 | 0.12 | 100 | 0.60 | 1.7 | 207 | 377 | 55.8 |
| 4.46 | 0.10 | 13.0 | 0.15 | 100 | 0.66 | 1.4 | 325 | 447 | 72.7 |

TABLE IV.—EFFECT OF PLASTICIZER ON MECHANICAL PROPERTIES

[PBBO=85 g. (0.05 eq.)]

| EM–1040–BO | | Plasticizer | | Curing temp., °C. | $\rho_x$ | R NCO/OH | $\sigma_m$, p.s.i. | $\epsilon_m$, percent | $E_m$, p.s.i. |
|---|---|---|---|---|---|---|---|---|---|
| G. | Eq. | G. | Percent of binder | | | | | | |
| 12.0 | 0.040 | 0 | 0 | 60 | 0.40 | 1.1 | 180 | 855 | 21 |
| 12.0 | 0.040 | 5.0 | 4.5 | 60 | 0.40 | 1.1 | 147 | 1040 | 14 |
| 12.0 | 0.040 | 10.0 | 8.6 | 60 | 0.40 | 1.1 | 93 | 973 | 9.6 |
| 12.0 | 0.040 | 15.0 | 12.4 | 60 | 0.40 | 1.1 | 72 | 972 | 7.4 |
| 12.0 | 0.040 | 20.0 | 15.9 | 60 | 0.40 | 1.1 | 86 | 892 | 9.6 |
| 12.0 | 0.040 | 25.0 | 19.9 | 60 | 0.40 | 1.1 | 76 | 834 | 9.1 |
| 12.0 | 0.040 | 35.0 | 24.9 | 60 | 0.40 | 1.1 | 53 | 836 | 6.3 |
| 12.0 | 0.040 | 0 | 0 | 100 | 0.40 | 1.1 | 178 | 236 | 71 |
| 12.0 | 0.040 | 5.0 | 4.5 | 100 | 0.40 | 1.1 | 154 | 272 | 57 |
| 12.0 | 0.040 | 10.0 | 8.64 | 100 | 0.40 | 1.1 | 121 | 252 | 48 |
| 12.0 | 0.040 | 15.0 | 12.4 | 100 | 0.40 | 1.1 | 116 | 282 | 41 |
| 12.0 | 0.040 | 20.0 | 15.9 | 100 | 0.40 | 1.1 | 105 | 254 | 42 |
| 12.0 | 0.040 | 25.0 | 19.1 | 100 | 0.40 | 1.1 | 93 | 271 | 34 |
| 12.0 | 0.040 | 35.0 | 24.9 | 100 | 0.40 | 1.1 | 73 | 284 | 26 |
| 3.7 | 0.012 | 5.0 | 5.05 | 100 | 0.18 | 1.0 | 108 | 648 | 16 |
| 3.7 | 0.012 | 10.0 | 9.60 | 100 | 0.18 | 1.0 | 85 | 645 | 13 |
| 3.7 | 0.012 | 15.0 | 13.7 | 100 | 0.18 | 1.0 | 75 | 633 | 12 |
| 3.7 | 0.012 | 20.0 | 17.5 | 100 | 0.18 | 1.0 | 74 | | |
| 3.7 | 0.012 | 25.0 | 21.0 | 100 | 0.18 | 1.0 | 62 | 794 | 7.8 |
| 3.7 | 0.012 | 30.0 | 24.1 | 100 | 0.18 | 1.0 | 71 | 988 | 7.0 |
| 22.5 | 0.075 | 0 | 0 | 100 | 0.54 | 1.0 | 219 | 497 | 44 |
| 22.5 | 0.075 | 5.0 | 4.05 | 100 | 0.54 | 1.0 | 249 | 589 | 42 |
| 22.5 | 0.075 | 10.0 | 7.78 | 100 | 0.54 | 1.0 | 183 | 540 | 34 |
| 22.5 | 0.075 | 15.0 | 11.2 | 100 | 0.54 | 1.0 | 139 | 450 | 31 |
| 22.5 | 0.075 | 30.0 | 20.9 | 100 | 0.54 | 1.0 | 85 | 420 | 20 |

Figure 25:
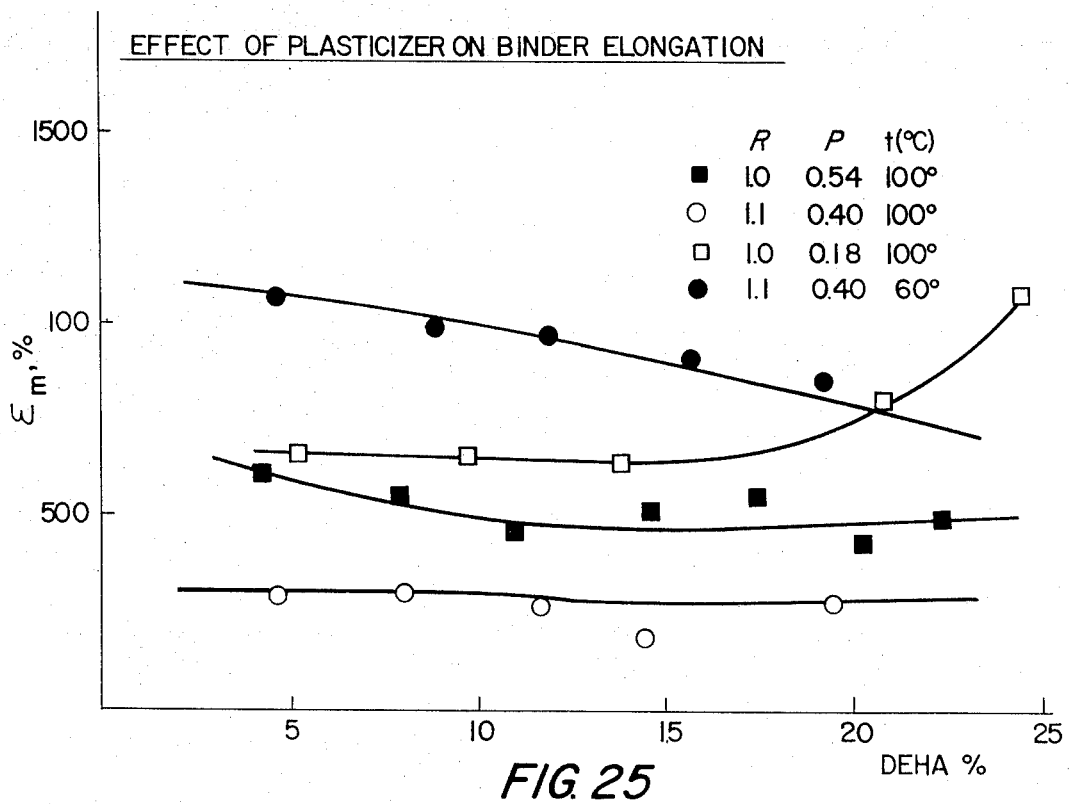
Figure 26:
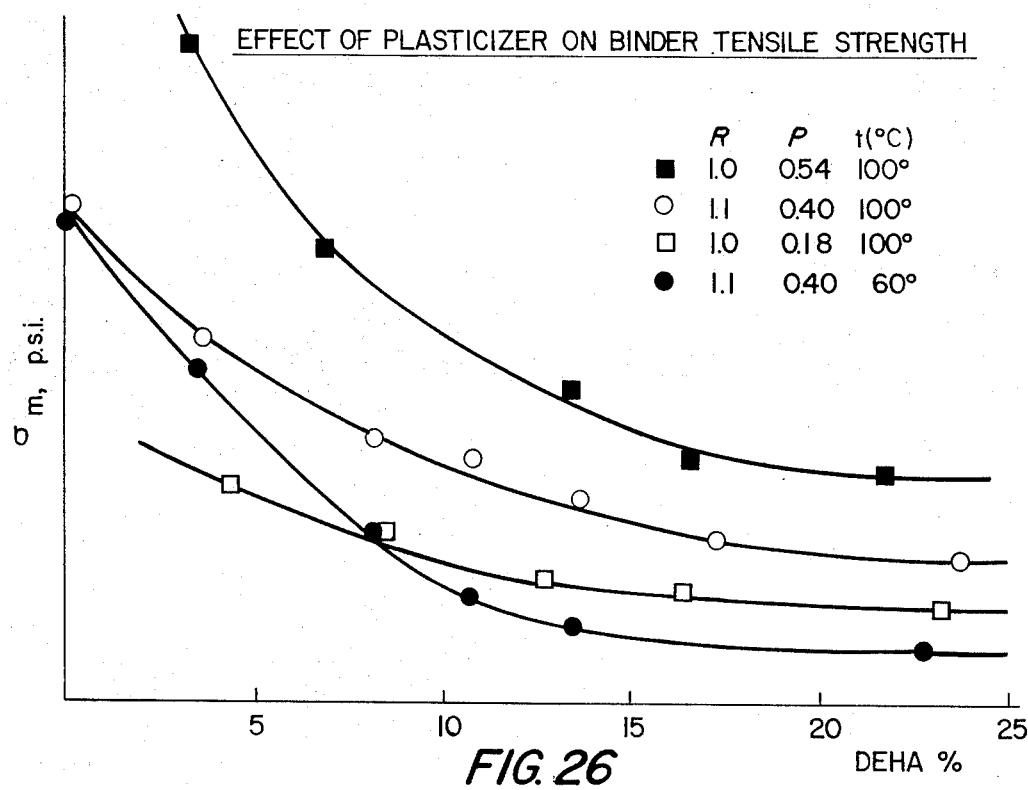
Figure 27:
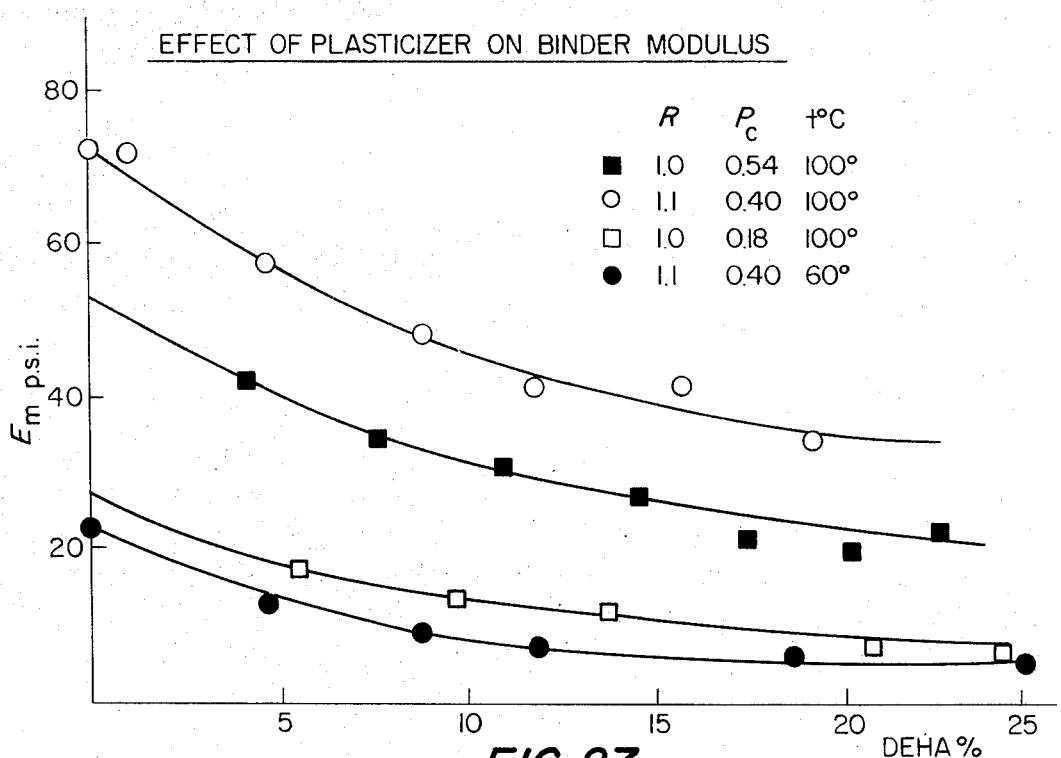

In FIGS. 25–27 it can be seen that at an R value of 1.3, the maximum tensile stress ($\sigma_m$) and the modulus at maximum stress ($E_m$) were maximum, but the elongation at maximum stress ($\epsilon_m$) was low. While at an R value of 1.0, $\epsilon_m$ was over 1000%. At an R value of 1.0, an increase in triol content in the binder increased $\sigma_m$ and $E_m$, but decreased $\epsilon_m$. An optimum was found at an equivalent ratio of triol to total hydroxyl of 0.35. $\epsilon_m$ is effectively increased by increasing the average chain length between branch units however, the effect of the molecular weight of the triol on the properties of the binder is not significant. With increasing percentages of DEHA plasticizer in the binder, up to 15%, both $\sigma_m$ and $E_m$ decreased in value, but $\epsilon_m$ changed only slightly. In general, at a curing temperature of 100° C., $E_m$ was found to be higher than at 60° C., while $\sigma_m$ and $\epsilon_m$ were superior at the lower curing temperature.

The mechanical properties of the propellant according to a preferred embodiment of the present invention were also determined in a manner similar to that of the binder.

It was found that propellants formulated with ammonium perchlorate and the above HTPB binders, followed a curing mechanism different from that of the binder. The gel time and the polymerization rate were respectively shorter and faster in the presence of the solid oxidizer. Oxidizer in high concentrations however behaved like a strong accelerator, the polymerization rate being proportional to the suface of solid oxidizer. Typical curves for elongation, tensile strength and initial modulus showed that maximum values are obtained at lower concentrations of curing agent. This fact may be explained by the catalytic action of the oxidizer in high concentrations by formation of additional cross-links. These curves showed that stress and elongation reached a maximum long before breakage. Sometimes the maximum corresponded roughly to the irreversible separation of the binder and solid oxidizer. While the modulus at maximum load reported on binders had some significance for an elastomeric binder, it was considered preferable to ascertain the initial modulus (E) of the propellant. These values are more significant in defining safe conditions of storage and operation of propellants.

Measurements of mechanical properties at different temperatures and different rates of straining are useful in assessing a popellant. These values were determined only at constant temperature (73° F.) and constant rate of straining (2 in./min.).

In addition to viscoelastic properties of elastomer binders, mechanical properties of propellants are influenced largely by the volume fraction of oxidizer (or the percentage) and the adhesion between the binder and filler particles. The effects of the two factors, percentage of solid oxidizer and amount of wetting agent are shown.

Since solid propellants follow a curing mechanism different from that of the binder owing to the presence of ammonium perchlorate, the different parameters already studied for the binders were evaluated in the presence of ammonium perchlorate. The different parameters studied were R (the ratio of NCO groups to total OH groups), $\rho_t$ (the fraction of triol OH to total OH groups), the percentage of plasticizer, the amount of catalyst FeAA and the curing temperature, all of which are parameters affecting the mechanical properties of the elastomeric propellants.

Although knowledge of the important parameters mentioned above describes the dependence of propellant properties on them, there are two side effects related to the occurrence of intramolecular reactions during the curing process. One is the reaction of some isocyanate with urethane hydrogen or some other part of the growing polymer chain to form branch sites or closed loops formed by intramolecular reaction. The other is the presence of monofunctional units that may vary from batch to batch. The weight recipe is hopelessly inadequate for supplying propellant formulation, but a propellant formulation can be completely described by the following parameters: R and $\rho_t$.

Materials (1) PBBO, polybutadiene carboxyl terminated (HC 434, Lot 84M) modified with butylene oxide. Its molecular weight found by OH determination was 3400 and 3630 by Vapor Phase osmometry 3630.
(2) Triol EM–1040–BO is made by esterification of Empol 1040 with butylene oxide. Empol 1040 is sold by Emery Industries, Inc. Triol EM–1040–BO had a molecular weight of 1260 by the hydroxyl determination and 1130 by the Vapor Phase Osmometer determination.
(3) T.D.I.—Tolylene diisocyanate, a mixture of 65%, 2,4-isomer and 35% 2,6-isomer.
(4) Bimodal ammonium perchlorate (AP). A mixture of 50/50 weight ratio of ammonium perchlorate (400$\mu$) and ammonium perchlorate (200$\mu$).
(5) Aluminum 15$\mu$.
(6) Solid load, a mixture of 41 weight percent AP (400$\mu$), 41 weight percent AP (200$\mu$), and 18 weight percent aluminum (15$\mu$).
(7) D.E.H.A., di(2-ethyl hexyl)azelate.
(8) FeAA (ferric acetyl acetonate).

Preparation of propellant sample

All specimens were prepared from a single batch of PBBO, which had a molecular weight of 3400 according to the hydroxyl group determination and from a uniform Triol EM–1040–BO with a molecular weight of 1260 (calculated from the hydroxyl determination). A multi-neck resin flask (2000 ml.) was fitted with a vacuum take-off. The ammonium perchlorate 400$\mu$ (164 g.), 200$\mu$ (164 g.) and the aluminum 15$\mu$ (72 g.) were weighed directly into the flask and carefully mixed. The binder mixture, formed by adding PBBO, Triol EM–1040–BO, bis-(2-ethyl hexyl)azelate, TDI, FeAA and Polymer N–8 shown in Tables V–IX given hereafter, was weighed and stirred in a separate beaker. One hundred gram lots of the above binder mixture were added to the solids in the resin kettle (to make an 80, 82 or 84 percent load) and stirred under vacuum. With a low percentage of azelate or with a higher solid load than 80 percent, the mixing and stirring were carried out at about 50–60° C. The solids were heated prior to the mixing to increase fluidity.

When mixing was over and foaming had ceased under vacuum, the propellant mixes were poured in Teflon Trays and cured at 60° C. for 7 days.

Testing of propellant

Figure 28:
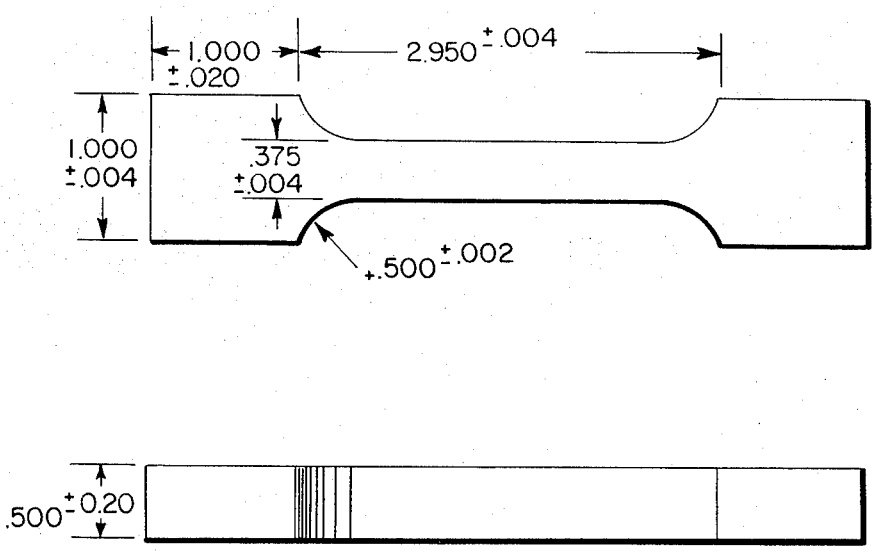
FIG. 28 illustrates the dimensions of the specimens used in testing the mechanical properties of the cured propellent samples.

The JANAF dog bones (FIG. 28) die-cut from these slabs and pulled at a rate of 2 in./min. were tested for their mechanical properties at 73° F. Tensile strength was calculated from the maximum load, taken directly from the scale of the testing machine. Maximum elongation was calculated from strain measured on the recorded stress/strain curve. Initial modulus was calculated from the slope of the recorded stress/strain curve at the start.

The mechanical properties of a propellant are influenced largely by the volume fraction of the oxidizer, the viscoelastic properties of the elastomeric binder and the adhesion between the binder and the solid particles. Before studying the adhesion between the binder and the solid particles and the influence of the volume fraction of the oxidizer, the mechanical properties of the elastomeric binder in the presence of a constant weight of solid oxidizer were measured. The time and temperature of curing were kept constant at 60° C. for 7 days, this was found to be the optimum conditions for the binder itself. The amount of catalyst (FeAA), plasticizer and hydroxyl-terminated polybutadiene (PBBO) were kept constant to determine the optimum ratio of isocyanate.

Effect of isocyanate to total hydroxyl ratio (R)

The optimum isocyanate ratio (R) was determined at different values of $\rho_t$ (Triol OH to total OH ratio). Assessment of the propellant slabs were made by calculating stress at maximum load ($\sigma_m$), elongation at maximum load ($\epsilon_m$) and Young's modulus (E) at various values of R for each value of $\rho_t$. The values obtained are given in Table V. Although the values of $\sigma_m$ and E increased with R and reached a maximum, $\epsilon_m$ decreased sharply with R. Since the mechanical properties required for a case-bonded grain during propellant cure, temperature cycling and motor ignition must meet some fixed values, depending on each application, the optimum value of R was chosen at 40 percent elongation. The modulus, tensile strength and elongation of propellants depend markedly on the temperature and strain rate at which they are measured, but an elongation of 40 percent measured at 73° F. and at a strain rate of 2 in./per min. seemed acceptable for most rocket applications. In addition, a tensile strength of 50 p.s.i. should be adequate for a wide variety of conditions. In that case, the modulus of the propellant will be sufficiently large to withstand flight acceleration and shrinkage during storage.

The sensitivity of E to R was determined by plotting E against R at different values of $\rho_t$. A typical curve is given in FIG. 29 where $\rho_t$ is equal to 0.150. The values of R and E at 40, 30 and 20 percent elongation were found graphically and are recorded in Table VI.

The sensitivity of tensile strength ($\sigma_m$) to R was also found by plotting $\sigma_m$ against R (see FIG. 29) at each value of $\rho_t$ and by evaluating graphically $\sigma_m$ and R at 40, 30 or 20 percent elongation. From the results summarized in Table VI, one can see that 40 percent elongation is obtained at an R value equal to 0.85. Drastically low elongations were obtained at an R value close to 1.0. An increase of the isocyanate to hydroxyl ratio above 0.85 increased the initial modulus and tensile strength but decreased the elongation. Values of $\sigma_m$ equal to 50 p.s.i. at 40 percent elongation were obtained at most of the triol concentrations studied.

Table IV shows that a formulation could be devised for any triol concentration with 40 percent elongation by adjusting the exact isocyanate to hydroxyl ratio (R).

Effect of triol hydroxyl to total hydroxyl ratio ($\rho_t$)

The Triol EM–1040–BO, used as cross-linker in the polybutadiene propellant has a molecular weight of 1260 by the hydroxyl determination and 1130 by determination with the vapor phase osmometer. The functionality of the triol was found to be 2.72 and was estimated as containing 90 percent trifunctional hydroxyl, and 5 percent difunctional-hydroxyl according to the values given for the starting material (Emery Empol 1040). Because of the uncertainty of the equivalent weight of Triol EM–1040–BO, R was varied at the same time as $\rho_t$, and an estimation of the optimum R for each value of $\rho_t$ was made. In addition, since propellant formulations containing wetitng agent had superior mechanical properties, propellant mixes having a constant percentage of Polymer N–8 were made with an increasing amount of cross-linker. $\rho_t$ was varied from 0.055 to 0.42. The results are summarized in Tables VII, VIII and IX. It can be seen that the lower the concentration of cross-linking agent, the more sensitive the formulations are to the stoichiometric balance of isocyanate and hydroxyl. At lower values of $\rho_t$ the minimum $\epsilon_m$ obtained in the presence of an excess of isocyanate is over 20 percent, compared with 6 percent at high values of $\rho_t$. The values of $\sigma_m$, $\epsilon_m$ and E were plotted against R for each value of $\rho_t$. Values of $\sigma_m$ and E at 40, 30 and 20 percent elongation were found graphically and the values obtained are reported in Table X, Table XI and Table XII.

When R was increased the minimum elongations were better at low values of $\rho_t$ than those which were obtained at high values of $\rho_t$. As the concentration of the cross-linker is increased the minimum elongation is decreased. With an excess of TDI minimum elongation can be lowered from 20 to about 6 percent by increasing the cross-linker content; this did not affect the maximum values of $\sigma_m$.

Effect of Polymer N–8

The concentration of Polymer N–8 (a polymer made from N-methyldiethanol amine and sebacic acid) was varied from 0.3 to 0.8 percent. The results with various values of R at constant $\rho_t$ are summarized in Tables VI, VII and VIII.

It has been shown that this wetting agent imparted increased strength and improved elongation to the propellants. By varying $\rho_t$ from 0.055 to 0.42 and Polymer N–8 in the binder from zero to 0.8 percent, the effect of the wetting agent on $\sigma_m$, $\epsilon_m$ and E was determined. $\sigma_m$, $\epsilon_m$ and E were plotted against R for each value of $\rho_t$ (FIG. 30). By determining graphically $\sigma_m$ at 40, 30 and 20 percent elongation it was seen that $\sigma_m$ at 40 percent elongation improved from 40 p.s.i. to 110 p.s.i. From the values of $\sigma_m$ at 40 percent found graphically and recorded in Tables IX, X, XI and XII, the graph of FIG. 31 was made where $\sigma_m$ at 40 percent is plotted against the percentage of Polymer N–8.

In FIG. 31 the optimum formulation contains between 0.3 and 0.5 percent of Polymer N–8 and has a ratio of triol hydroxyl between 0.082 and 0.106. Polymer N–8 improved the adhesion of the binder to the solid particle and is more efficient at a low triol OH concentration.

Higher concentrations of Polymer N–8 produced relatively lower increases in strength at constant elongation. Maximum values of $\sigma_n$ at 40 percent elongation were obtained at a concentration of 0.4 percent of Polymer N–8 in the binder. Propellant formulations with cross-linker concentration in the vicinity of 0.1 had the highest $\sigma_m$ at 40 percent elongation. The wetting power of Polymer N–8 was so effective that concentrations in excess of 0.5% of the binder gave lower improvements in mechanical properties, and decreased the facility of mixing the ingredients.

Effect of plasticizer on propellant mechanical properties

The addition of a plasticizer (DEHA) to the HTPB propellants is made to lower the viscosity of the solid-binder mixture and to facilitate the mixing of all the ingredients. By increasing the percentage of plasticizer, both $\sigma_m$ and E were decreased but $\epsilon_m$ was only slightly changed (Table XIII and FIG. 32).

Propellant mixes with 12.5 percent of DEHA in the binder were found suitable for mixing purposes. While lowering the mechanical properties to some extent (up to 84 percent solid) the paste was still pourable and relatively easy to mix in the laboratory.

Percentage of solid

The solid composition (41% of ammonium perchlorate 400µ, 41% of ammonium perchlorate 200µ and 18% of aluminum 15µ) was kept constant at 80 percent to determine the parameters R and $\rho_t$. Increasing the solid content of the propellant from 80 to 84 percent at constant triol ratio and optimum isocyanate ratio, no noticeable effect was noted on the mechanical properties (Table XIV). The viscosity of the mixture was increased slightly, but the effect was more obvious at low triol concentration and was noticed mostly in the presence of an excess of T.D.I. and a high concentration of Polymer N–8.

Time of curing with the amount of catalyst FeAA

The curing of PBBO with T.D.I. is very sensitive to minute traces of FeAA. By increasing the catalyst content from 0.023%, which was the concentration kept constant in all experiments, to 0.188 percent of FeAA in the PBBO, the curing time was shortened from 7 days to one day (Table XV).

At high concentration of FeAA the pot-life is shortened to a maximum of one to two hours. Since a low concentration of triol increased the viscosity of the propellant mixes, a low value of $\rho_t$ was chosen to study the problems encountered upon mixing. The variation of FeAA from 0.03 to 0.094, besides increasing the viscosity of the mixes, had a bad effect on $\epsilon_m$. This was lowered from about 40 to 20 percent. Even with a low concentration of FeAA, the curing was practically complete after one day.

Curing at room temperature

If an increased amount of FeAA was added to PBBO, curing can be made at room temperature. Curing was nearly complete after 3 days at 25° C. with 0.188 percent of FeAA in the prepolymer. The viscosity of the mixes was increased however, but different samples have given constant mechanical properties after 10 days (Table XVI).

Lower concentrations of FeAA would not produce cure after 10 days, which is considered too long for practical purposes.

TABLE V.—EFFECT OF R AND $\rho_t$ ON THE MECHANICAL PROPERTIES OF HTPB PROPELLANTS WITH NO WETTING ADDITIVE

[PBBO, 85 g. (0.05 eq.); solid, 80%; curing temp., 60° C.; curing time, 7 days; FeAA, 0.023% of binder; D.E.H.A., 20% of binder]

| Empol-BO, eq.×10² | $\rho_t$ | R | $\sigma_m$, p.s.i. Max. | $\sigma_m$, p.s.i. Rupt. | $\epsilon_m$, percent Max. | $\epsilon_m$, percent Rupt. | E, p.s.i. |
|---|---|---|---|---|---|---|---|
| 1.01 | 0.15 | 0.916 | 60.2 | 59.7 | 18.8 | 20.4 | 780 |
| | | 1.00 | 85.3 | 88.1 | 6.3 | 7.7 | 2,320 |
| | | 1.08 | 75.4 | 77.9 | 4.0 | 4.2 | 2,830 |
| | | 1.16 | 89.1 | 45.2 | 5.9 | 11.1 | 2,430 |
| | | 1.25 | 82.1 | 80.5 | 8.3 | 9.0 | 1,850 |
| | | 1.36 | 77.1 | 73.5 | 10.0 | 11.8 | 1,460 |
| 2.02 | 0.257 | 0.857 | 37.0 | 32.7 | 42.4 | 52.3 | 390 |
| | | 0.914 | 60.4 | 58.8 | 19.2 | 21.7 | 880 |
| | | 1.00 | 90.3 | 89.2 | 6.0 | 6.3 | 2,630 |
| | | 1.07 | 77.9 | 68.9 | 3.9 | 5.3 | 2,800 |
| | | 1.14 | 85.3 | 84.9 | 4.4 | 4.5 | 2,920 |
| | | 1.25 | 85.7 | 84.4 | 7.9 | 8.7 | 1,980 |
| 3.35 | 0.361 | 0.718 | | | | | |
| | | 0.838 | 41.2 | 32.0 | 43.4 | 56.9 | 510 |
| | | 0.886 | 50.8 | 48.6 | 21.5 | 29.4 | 650 |
| | | 0.958 | 87.8 | 86.9 | 5.8 | 6.1 | 2,680 |
| | | 1.04 | 85.9 | 65.7 | 4.2 | 7.6 | 3,390 |
| | | 1.12 | 77.4 | 58.1 | 6.7 | 11.3 | 2,090 |
| | | 1.19 | 82.3 | 58.2 | 6.8 | 11.0 | 2,190 |
| | | 1.31 | 63.3 | 48.2 | 10.9 | 22.8 | 1,250 |
| 5.04 | 0.452 | 0.700 | 33.5 | 29.8 | 55.6 | 66.5 | 280 |
| | | 0.800 | 75.6 | 73.4 | 8.8 | 9.2 | 1,920 |
| | | 0.920 | 79.6 | | 3.7 | 8.4 | 3,540 |
| | | 1.00 | 85.9 | | 3.6 | | 3,310 |
| | | 1.08 | 82.3 | | 3.9 | | 3,340 |
| 6.74 | 0.516 | 0.715 | | | | | |
| | | 0.817 | 55.4 | 50.2 | 13.9 | 17.3 | 1,040 |
| | | 0.945 | 80.5 | | 3.5 | | 3,700 |
| | | 1.02 | 80.4 | | 3.4 | | 3,900 |
| | | 1.11 | 76.6 | 75.4 | 5.8 | 6.3 | 2,410 |
| | | 1.19 | 84.8 | 83.1 | 6.0 | 6.6 | 2,620 |
| 10.1 | 0.602 | 0.794 | 46.5 | 40.3 | 9.3 | 13.6 | 1,230 |
| | | 0.993 | 67.4 | | 3.4 | | 3,710 |
| | | 1.06 | 83.1 | | 3.6 | | 4,500 |
| | | 1.16 | 70.7 | 69.6 | 4.7 | 5.1 | 2,700 |
| | | 1.24 | 64.2 | 61.8 | 7.7 | 7.7 | 1,580 |

TABLE VI.—EFFECT OF TRIOL AND T.D.I. AT CONSTANT $\epsilon_m$ ON THE MECHANICAL PROPERTIES OF HTPB PROPELLANTS WITHOUT WETTING AGENT N-8

[FeAA, 0.023% of binder; solid content, 80%]

| $\rho_t$, triol OH/ total OH | R NCO/ OH | DEHA, percent | $\sigma_m$, p.s.i. | $\epsilon_m$, percent | E, p.s.i |
|---|---|---|---|---|---|
| 0.15 | 0.85 | 20 | 40 | 40 | Nil |
| | 0.87 | | 47 | 30 | 300 |
| | 0.92 | | 58 | 20 | 900 |
| | 0.96 | | 74 | 10 | 1,900 |
| 0.257 | 0.86 | 20 | 40 | 40 | 200 |
| | 0.88 | | 50 | 30 | 450 |
| | 0.91 | | 62 | 20 | 1,300 |
| | 0.96 | | 78 | 10 | 1,900 |
| 0.361 | 0.85 | 20 | 43 | 40 | 100 |
| | 0.87 | | 51 | 30 | 600 |
| | 0.89 | | 61 | 20 | 1,050 |
| | 0.92 | | 68 | 10 | 1,450 |

TABLE VII.—EFFECT OF R AND $\rho_t$ ON THE MECHANICAL PROPERTIES OF HTPB PROPELLANTS CONTAINING 0.3% OF POLYMER N-8 IN THE BINDER

[PBBO, 85 g. (0.05 eq.); solid, 80%; curing temp., 60° C.; curing time, 7 days; FeAA, 0.023% of binder; D.E.H.A., 12.5%; Polymer N-8, 0.3%]

| Triol-BO, eq.×10² | $\rho_t$ | R | $\sigma_m$, p.s.i. Max. | $\sigma_m$, p.s.i. Rupt. | $\epsilon_m$, percent Max. | $\epsilon_m$, percent Rupt. | E, p.s.i. |
|---|---|---|---|---|---|---|---|
| 0.330 | 0.0550 | 0.906 | 24.0 | 22.1 | 80.5 | 83.4 | |
| | | 0.951 | 88.5 | 87.6 | 65.2 | 67.3 | 970 |
| | | 1.01 | 140 | 139 | 21.5 | 22.2 | 1,870 |
| | | 1.06 | 147 | 146 | 20.3 | 20.9 | 1,990 |
| | | 1.12 | 154.0 | | 21.2 | | 2,270 |
| 0.404 | 0.0670 | 0.893 | 32.5 | 27.2 | 61.9 | 92.8 | 265 |
| | | 0.943 | 76.4 | 72.5 | 55.0 | 67.2 | 810 |
| | | 1.00 | 122.0 | | 25.6 | | 1,740 |
| | | 1.06 | 136 | | 24.6 | | 2,160 |
| | | 1.13 | 130 | 129 | 28.2 | 29.0 | 1,930 |
| 0.500 | 0.0818 | 0.927 | | | | | |
| | | 0.982 | 57.5 | 56.3 | 82.9 | 86.5 | 480 |
| | | 1.04 | 130 | | 26.8 | | 1,930 |
| | | 1.13 | 137 | | 21.4 | | 2,060 |
| | | 1.17 | 134 | | 31.9 | | 1,930 |
| 0.674 | 0.106 | 0.952 | 69.6 | 68.8 | 61.1 | 63.2 | 630 |
| | | 1.01 | 108 | | 35.5 | | 1,210 |
| | | 1.05 | 130 | | 21.0 | | 1,900 |
| | | 1.13 | 137 | 136 | 16.9 | 17.7 | 2,250 |
| | | 1.19 | 123 | 121 | 34.1 | 37.3 | 1,700 |
| 1.01 | 0.150 | 0.916 | 84.5 | 79.3 | 57.7 | 70.8 | 810 |
| | | 0.958 | 138 | 137 | 14.0 | 15.6 | 1,740 |
| | | 1.00 | 141 | | 8.0 | 8.2 | 2,829 |
| | | 1.03 | 157 | 156 | 8.0 | 8.0 | 3,340 |
| 2.02 | 0.257 | 0.856 | 57.9 | 56.8 | 118 | 121 | 430 |
| | | 0.886 | 71.9 | 70.8 | 111 | 117 | 490 |
| | | 0.914 | 106 | 105 | 95.7 | 97.3 | 750 |
| | | 0.971 | 105 | 104 | 32.8 | 34.3 | 1,360 |
| | | 1.00 | 138 | | 12.8 | | 1,860 |
| 3.35 | 0.361 | 0.798 | 73.2 | 71.7 | 99.1 | 103 | 610 |
| | | 0.838 | 25.1 | 21.3 | 85.0 | 101 | 330 |
| | | 0.888 | 78.6 | 77.4 | 42.7 | 45.9 | 900 |
| | | 0.922 | 92.6 | 92.6 | 31.8 | 32.3 | 1,040 |
| | | 0.958 | 142 | 141 | 8.3 | 8.7 | 3,140 |
| 4.38 | 0.420 | 0.799 | 33.2 | 32.4 | 85.5 | 88.1 | 260 |
| | | 0.831 | 73.2 | 71.6 | 64.7 | 68.9 | 680 |
| | | 0.852 | 80.3 | 79.4 | 34.9 | 36.8 | 1,040 |

TABLE VIII.—EFFECT OF R AND $\rho_t$ ON THE MECHANICAL PROPERTIES OF HTPB PROPELLANTS CONTAINING 0.5% OF POLYMER N-8

[PBBO, 85 g. (0.05 eq.); solid, 80%; time and temp. of curing, 7 days at 60° C.; FeAA, 0.023% of binder; D.E.H.A., 12.5% of binder]

| Triol-BO, eq.×10² | $\rho_t$ | R | $\sigma_m$, p.s.i. Max. | $\sigma_m$, p.s.i. Rupt. | $\epsilon_m$, percent Max. | $\epsilon_m$, percent Rupt. | E, p.s.i. |
|---|---|---|---|---|---|---|---|
| 0.330 | 0.0550 | 0.948 | 35.7 | 32.8 | 63.7 | 77.3 | 240 |
| | | 1.012 | 60.0 | 56.4 | 44.7 | 51.8 | 688 |
| | | 1.05 | 98.3 | 96.2 | 33.8 | 36.1 | 1,330 |
| | | 1.12 | 132 | 129 | 28.4 | 30.3 | 1,950 |
| 0.404 | 0.0671 | 0.943 | 99.2 | 98.7 | 38.6 | 40.5 | 1,400 |
| | | 1.00 | 74.8 | 73.1 | 41.4 | 45.9 | 910 |
| | | 1.06 | 92.2 | 97.2 | 43.6 | 48.5 | 1,440 |
| | | 1.12 | 117 | 116 | 37.6 | 38.7 | 1,250 |
| 0.500 | 0.0818 | 0.982 | 53.7 | 51.9 | 43.4 | 49.4 | 630 |
| | | 1.05 | 92.5 | 91.8 | 36.3 | 37.2 | 1,150 |
| | | 1.13 | 136.4 | 136 | 25.2 | 25.6 | 1,980 |
| 0.674 | 0.106 | 0.952 | 35.5 | 33.5 | 81.1 | 88.6 | 290 |
| | | 1.01 | 80.4 | 78.6 | 62.7 | 67.3 | 720 |
| | | 1.05 | 133 | | 27.9 | | 1,850 |
| | | 1.13 | 143 | | 23.0 | | 2,140 |
| | | 1.19 | 129 | 128 | 36.0 | 37.4 | 1,640 |
| 1.05 | 0.150 | 0.916 | 63.9 | 62.7 | 56.7 | 29.1 | 630 |
| | | 0.958 | 116 | 114 | 33.0 | 33.3 | 1,680 |
| | | 1.00 | 93.9 | 93.2 | 19.8 | 20.7 | 1,250 |
| | | 1.03 | 153 | 152 | 13.4 | 13.8 | 2,680 |
| 2.02 | 0.257 | 0.856 | 76.1 | 75.4 | 52.1 | 53.2 | 780 |
| | | 0.885 | 55.1 | 54.5 | 41.0 | 41.2 | 725 |
| | | 0.919 | 72.0 | 91.2 | 38.1 | 38.0 | 1,110 |
| | | 0.956 | 113 | 112 | 31.6 | 32.5 | 1,840 |
| | | 1.00 | 140 | 137 | 11.8 | 11.4 | 3,020 |
| 3.35 | 0.361 | 0.838 | 21.5 | 17.5 | 64.0 | 65.4 | 980 |
| | | 0.881 | 64.0 | 63.2 | 80.0 | 81.7 | 945 |
| | | 0.922 | 91.3 | 90.4 | 39.8 | 41.1 | 1,320 |
| | | 0.964 | 111 | 110 | 21.9 | 22.4 | 1,950 |
| 4.38 | 0.420 | 0.834 | 19.4 | 13.9 | 66 | 70.5 | 450 |
| | | 0.858 | 29.8 | 28.6 | 67.5 | 72.5 | 730 |
| | | 0.912 | 76.8 | 72.2 | 62.5 | 63.2 | 860 |

TABLE IX.—EFFECT OF $\rho_t$ AND R ON THE MECHANICAL PROPERTIES OF HTPB PROPELLANTS CONTAINING 0.8% OF POLYMER N-8

[PBBO: 85 g. (0.05 eq.); solid, 80%; time and temp. of curing, 7 days at 60° C.; FeAA, 0.023% of the binder]

| Empol-BO, eq.×10² | DEHA, percent | $P_t$ | R | $\sigma_m$, p.s.i. Max. | $\sigma_m$, p.s.i. Rupt. | $\epsilon_m$, percent Max. | $\epsilon_m$, percent Rupt. | E, p.s.i. |
|---|---|---|---|---|---|---|---|---|
| 0.330 | 12.5 | 0.0550 | 1.01 | 52.6 | 50.0 | 44.0 | 51.7 | 610 |
|  |  |  | 1.05 | 82.8 | 81.9 | 32.4 | 34.6 | 1,110 |
|  |  |  | 1.12 | 129 | 126 | 24.6 | 27.0 | 2,100 |
| 0.404 | 12.5 | 0.0670 | 1.06 | 63.3 | 61.7 | 33.0 | 36.6 | 750 |
|  |  |  | 1.13 | 126 | 123 | 21.7 | 25.5 | 1,920 |
| 0.500 | 12.5 | 0.0818 | 0.981 | 50.9 | 45.1 | 56.3 | 76.9 | 530 |
|  |  |  | 1.05 | 87.4 | 85.9 | 32.2 | 36.4 | 1,110 |
|  |  |  | 1.13 | 134 | 131 | 22.0 | 24.3 | 2,120 |
| 0.674 | 12.5 | 0.106 | 0.95 | 43.1 | 38.9 | 53.3 | 60.5 | 430 |
|  |  |  | 1.01 | 84.5 | 82.7 | 32.7 | 37.7 | 1,000 |
|  |  |  | 1.03 | 111 | 110 | 22.2 | 23.2 | 1,680 |
|  |  |  | 1.13 | 140 | 138 | 22.8 | 23.8 | 2,130 |
|  |  |  | 1.19 | 125 | 123 | 37.0 | 40.2 | 1,670 |
| 1.01 | 20.0 | 0.150 | 1.00 | 84.3 |  | 38.8 |  | 940 |
|  |  |  | 1.08 | 129 |  | 20.2 |  | 1,580 |
|  |  |  | 1.16 | 133 | 131 | 19.2 | 19.6 | 1,910 |
|  |  |  | 1.25 | 127 | 126 | 19.8 | 20.0 | 1,760 |
|  |  |  | 1.37 | 134 | 133 | 34.6 | 35.5 | 1,320 |
| 2.02 | 20.0 | 0.257 | 0.857 | 39.9 | 37.1 | 104 | 123 | 300 |
|  |  |  | 0.914 | 68.1 | 66.3 | 53.5 | 56.6 | 590 |
|  |  |  | 1.00 | 117 | 116 | 20.4 | 21.2 | 1,837 |
|  |  |  | 1.07 | 159 |  | 14.4 |  | 2,540 |
| 3.35 | 20.0 | 0.361 | 0.838 | 58.0 | 56.7 | 83.2 | 87.2 | 370 |
|  |  |  | 0.886 | 64.0 | 61.8 | 71.8 | 78.4 | 375 |
|  |  |  | 0.957 | 133 | 132 | 9.7 | 10.0 | 2,530 |
|  |  |  | 1.04 | 141 | 140 | 11.1 | 11.5 | 2,800 |
|  |  |  | 1.12 | 121 | 120 | 16.5 | 16.9 | 2,010 |

TABLE X.—EFFECT OF TRIOL AND T.D.I. AT CONSTANT $E_m$ ON THE MECHANICAL PROPERTIES OF HTPB PROPELLANTS CONTAINING 0.3% OF N-8 WETTING AGENT IN THE BINDER

[FeAA, 0.23% of binder; solid content, 80.0%; DEHA, 12.5% of the binder]

| $\rho_t$ Triol OH/ total OH | R, NCO/OH | $\sigma_m$, p.s.i. | $\epsilon_m$, percent | E, p.s.i. |
|---|---|---|---|---|
| 0.055 | 0.98 | 118 | 40 | 1,500 |
|  | 0.99 | 133 | 30 | 1,700 |
|  | 1.04 | 144 | 20 | 2,000 |
| 0.067 | 0.96 | 90 | 40 | 1,330 |
|  | 0.98 | 105 | 30 | 1,620 |
|  | 1.05 | 136 | 20 | 2,000 |
| 0.082 | 1.02 | 110 | 40 | 1,500 |
|  | 1.04 | 122 | 30 | 1,900 |
|  | 1.09 | 137 | 20 | 2,050 |
| 0.106 | 1.00 | 102 | 40 | 1,230 |
|  | 1.03 | 110 | 30 | 1,450 |
|  | 1.06 | 133 | 20 | 2,050 |
| 0.150 | 0.93 | 100 | 40 | 1,200 |
|  | 0.94 | 106 | 30 | 1,400 |
|  | 0.95 | 115 | 20 | 1,600 |
| 0.257 | 0.90 | 92 | 40 | 1,500 |
|  | 0.92 | 104 | 30 | 1,600 |
|  | 0.96 | 125 | 20 | 1,750 |

TABLE XI.—EFFECT OF TRIOL AND T.D.I. AT CONSTANT $E_m$ ON THE MECHANICAL PROPERTIES OF HTPB PROPELLANTS CONTAINING 0.5% OF N-8 WETTING AGENT IN THE BINDER

[FeAA, 0.023% of binder, solid content, 80%; DEHA, 12.5% of the binder]

| $\rho_t$ Triol OH/ total OH | R, NCO/OH | DEHA, percent | $\sigma_m$, p.s.i. | $\epsilon_m$, percent | E, p.s.i. |
|---|---|---|---|---|---|
| 0.055 | 1.02 | 12.5 | 82 | 40 | 800 |
|  | 1.08 | 12.5 | 115 | 30 | 1,500 |
|  | 1.13 | 12.5 | 150 | 20 | 2,000 |
| 0.082 | 1.01 | 12.5 | 72 | 40 | 900 |
|  | 1.09 |  | 115 | 30 | 1,300 |
|  | 1.15 |  | 140 | 20 | 2,100 |
| 0.106 | 1.02 | 12.5 | 110 | 40 | 1,500 |
|  | 1.04 |  | 135 | 30 | 1,750 |
|  | 1.1 |  | 145 | 20 | 2,200 |
| 0.150 | 0.94 | 20 | 85 | 40 | 930 |
|  | 0.97 | 20 | 105 | 30 | 1,210 |
|  | 1.0 | 20 | 128 | 20 | 1,630 |
| 0.257 | 0.92 | 20 | 85 | 40 | 850 |
|  | 0.94 | 20 | 100 | 30 | 1,110 |
|  | 0.96 | 20 | 120 | 20 | 1,660 |
| 0.361 | 0.92 |  | 90 | 40 | 1,200 |
|  | 0.95 |  | 100 | 30 | 1,600 |
|  | 0.97 |  | 110 | 20 | 2,250 |

TABLE XII.—EFFECT OF TRIOL AND T.D.I. AT CONSTANT $\rho_t$ ON THE MECHANICAL PROPERTIES OF HTPB PROPELLANTS CONTAINING 0.8% OF N-8 WETTING AGENT IN THE BINDER

[FeAA, 0.023% of binder; solid content, 80%; DEHA, 12.5% of the binder]

| $\rho_t$, Triol OH/ total OH | R NCO/OH | $\sigma_m$, p.s.i. | $\epsilon_m$, percent | e, p.s.i. |
|---|---|---|---|---|
| 0.055 | 1.02 | 60 | 40 | 930 |
|  | 1.07 | 97 | 30 | 1,750 |
|  | 1.18 | 140 | 20 | 1,600 |
| 0.082 | 1.02 | 70 | 40 | 870 |
|  | 1.06 | 112 | 30 | 1,560 |
|  | 1.14 | 140 | 20 | 2,200 |
| 0.106 | 0.98 | 65 | 40 | 1,360 |
|  | 1.01 | 90 | 30 | 1,600 |
|  | 1.04 | 115 | 20 | 2,200 |
| 0.150 | 1.00 | 80 | 40 | 1,500 |
|  | 1.03 | 105 | 30 | 2,000 |
|  | 1.08 | 125 | 20 | 2,400 |
| 0.257 | 0.93 | 80 | 40 | 750 |
|  | 0.96 | 95 | 30 | 1,500 |
|  | 1.00 | 118 | 20 | 2,030 |
| 0.361 | 0.90 | 95 | 40 | 1,300 |
|  | 0.910 | 105 | 30 | 1,500 |
|  | 0.925 | 115 | 20 | 2,200 |

TABLE XIII.—EFFECT OF PLASTICIZER

[PBBO, 85 g. (0.05 eq.); solid, 80%; time and temp. of the curing, 7 days at 60° C.; Empol-BO, 11.3 g. (0.0269 eq.); T.D.I., 7.8 (0.09 eq.); $\rho_t$, 0.362; R 0.885]

| DEHA, percent | $\sigma_m$, p.s.i. Max. | $\sigma_m$, p.s.i. Rupt. | $\epsilon_m$, percent Max. | $\epsilon_m$, percent Rupt. | E, p.s.i. |
|---|---|---|---|---|---|
| 5.00 | 104 |  | 11.8 |  | 2,190 |
| 10.0 | 88.2 |  | 11.4 |  | 1,880 |
| 15.0 | 73.7 |  | 10.4 |  | 1,660 |
| 20.0 | 66.0 |  | 11.5 |  | 1,470 |
| 25.0 | 44.3 |  | 16.9 | 18.5 | 670 |
| 30.0 | 46.7 |  | 11.5 |  | 850 |

TABLE XIV.—VARIATION OF MECHANICAL PROPERTIES WITH SOLID LOAD AND TRIOL ON CONTENT $\rho_t$

[LOT 84M—N-8, 0.3%; FeAA, 0.023%; DEHA, 12.5% of the binder]

| $\rho_t$, triol OH/total OH | R, NCO/OH | Solid load, percent | $\sigma_m$, p.s.i. | $\epsilon_m$, percent | E, p.s.i. |
|---|---|---|---|---|---|
| 0.055 | 0.978 | 80 | 115.8 | 31.1 | 1,686 |
| 0.106 | 1.00 | | 109.4 | 36.6 | 1,314 |
| 0.150 | 0.93 | | 100.6 | 94.8 | 613 |
| 0.055 | 0.978 | 82 | 105.2 | 30.9 | 1,542 |
| 0.106 | 1.00 | | 97.2 | 31.6 | 1,421 |
| 0.150 | 0.93 | | 106.9 | 66.0 | 841 |
| 0.055 | 0.978 | 84 | 111.9 | 26.5 | 1,895 |
| 0.106 | 1.00 | | 134.2 | 41.0 | 1,870 |
| 0.150 | 0.93 | | 115.4 | 38.4 | 1,313 |

TABLE XV.—EFFECT OF CATALYST FeAA AT 60° C.

[PBBO, 85 g. (0.05 eq.); solid content, 80%; temp. of curing 60° C.; DEHA' (12.5% of the binder; $\rho_t$; 0.055; R, 0.98; Polymer N-8, 0.3% of the binder]

| FeAA, percent of PBBO | Time of curing, days | $\sigma_m$, p.s.i. Max. | $\sigma_m$, p.s.i. Rupt. | $\epsilon_m$, percent Max. | $\epsilon_m$, percent Rupt. | E, p.s.i |
|---|---|---|---|---|---|---|
| 0.188 | 1 | 169.9 | | 18.0 | | 2,552 |
| | 2 | 172.0 | | 19.0 | | 2,434 |
| | 3 | 172.1 | 171.4 | 22.0 | 22.0 | 2,329 |
| 0.094 | 1 | 158.2 | | 25.0 | | 2,380 |
| | 2 | 153.0 | | 22.0 | | 2,292 |
| | 3 | 156.3 | 155.8 | 26.0 | 27.0 | 2,066 |
| 0.047 | 1 | 101.0 | 98.2 | 58.0 | 63.0 | 1,106 |
| | 2 | 110.0 | 109.0 | 35.0 | 38.0 | 1,619 |
| | 3 | 135.5 | 133.1 | 33.0 | 35.0 | 1,965 |
| | 4 | 111.0 | 110.3 | 29.0 | 31.0 | 1,661 |
| | 5 | 114.2 | 112.4 | 40.0 | 45.0 | 1,449 |
| 0.03 | 1 | 115.0 | 113.1 | 40.0 | 42.0 | 1,493 |
| | 2 | 113.0 | 111.0 | 33.0 | 35.0 | 1,663 |
| | 3 | 107.0 | 105.0 | 61.0 | 67.0 | 1,122 |
| | 4 | 97.9 | 96.4 | 60.0 | 64.0 | 952 |
| | 5 | 114.7 | 113.7 | 33.0 | 34.0 | 1,537 |

TABLE XVI.—VARIATION OF MECHANICAL PROPERTIES WITH FeAA CATALYST AND TIME AT 25° C.

[PBBO, 85 g. (0.05 eq.); solid content, 80% temp. of curing, 60° C.; DEHA, 12.5% of the binder; $\rho_t$, 0.055; R, 0.99; Polymer N-8, 0.3%]

| FeAA, percent of PBBO | Time of curing, days | $\sigma_m$, p.s.i. Max. | $\sigma_m$, p.s.i. Rupt. | $\epsilon_m$, percent Max. | $\epsilon_m$, percent Rupt. | E, p.s.i. |
|---|---|---|---|---|---|---|
| 0.188 | 1 | 101.0 | 99 | 36.0 | 41.0 | 975 |
| | 2 | 122.0 | 120 | 34.0 | 37.0 | 1,260 |
| | 3 | 137.0 | 133 | 42.0 | 44.0 | 1,400 |
| | 4 | | | | | |
| | 5 | 147.0 | 145 | 33.0 | 34 | 1,600 |
| | 6 | 155.0 | 153 | 30 | 32 | 1,840 |
| | 7 | 121 | | 35 | | 1,330 |
| | 8 | 159 | 158 | 30 | | 1,900 |
| | 9 | 157 | | 29 | | 1,760 |
| 0.094 | 6 | 65 | 63 | 64 | 66 | 600 |
| | 7 | 97 | 96 | 56.0 | 59 | 760 |
| | 8 | 71 | 69 | 56 | 61 | 630 |
| | 9 | 72 | 71 | 87 | 89 | 450 |
| 0.047 | 8 | 69 | 67 | 53 | 53 | 730 |
| | 9 | 19 | | 102 | 104 | 140 |
| | 11 | 19 | 16 | 40 | 81 | 180 |
| | 12 | 41.4 | 38 | 97 | 113 | 360 |
| 0.03 | 13 | 21 | | 105 | | 165 |

From the above it will be seen that optimum propellant formulations were found at values of R between 0.85 to 0.91. Elongation at maximum load ($\epsilon_m$) was between 40 to 20 percent elongation in the absence of a wetting agent. In the presence of a wetting agent (Polymer N-8), optimum propellant formulations were found at values of $\rho_t$ and R at 0.1 and 1.0, respectively. Maximum tensile strength of 110 p.s.i. at 40 percent elongation was obtained at these values in the presence of 0.4 percent of Polymer N-8.

The sensitivity of $\sigma_m$, $\epsilon_m$ and E to the amount of a wetting agent (Polymer N-8) was determined. In the absence of a wetting agent, $\sigma_m$ at 40 percent elongation is too low to be of interest. If Polymer N-8 is added and varied from 0 to 0.8 percent, the value of $\sigma_m$ at 40 percent elongation reached a maximum of 100 p.s.i. at a concentration of 0.4 percent and then decreased with increasing amounts of wetting agent. In the presence of Polymer N-8, an excess of TDI was less detrimental to the elongation at low values of $\rho_t$.

The addition of plasticizer lowered the ultimate tensile strength and the initial modulus but increased the elongation. The mechanical properties were slightly modified upon increasing the solid content from 80 to 84 percent.

The time of curing at 60° C. may be shortened to one day by increasing the amount of FeAA to 0.047 percent of PBBO, however, the bulk viscosity was increased and the pot-life of the mix was shortened. The temperature of curing may be reduced to room temperature by increasing the amount of FeAA to 0.188 percent of PBBO. Curing at room temperature is complete after 5 days by using HTPB prepolymer containing 0.188 percent of FeAA.

One can summarize that, independently from the monofunctional impurities found in the diol and the triol, the concentration of cross-linking agent EM-1040-BO between 0.08-0.1 would yield the optimum formulations. All formulations with lower content had lower $\sigma_m$ at 40 percent elongation, and all those with higher triol content were obviously undercured having both low elongation and low tensile strength in the presence of Polymer N-8.

The effect of parameter R shows that optimum properties are not found when isocyanate and hydroxyl groups are in stoichiometric ratio, but rather when R is decreased by increasing the triol concentration. It is also noted that the lower the concentration of triol, the more the formulations are sensitive to R. Some definite concentration of triol is required to compensate for the concentration of monofunctional units, and as the triol concentration is lowered the isocyanate had to be increased. This explains the fact that an excess of isocyanate is required in the presence of a lower amount of triol.

The wetting agent Polymer N-8 was found to improve the mechanical properties of HTPB propellant in the same fashion as was found for polyoxyglycols. An addition of 0.4 percent of Polymer N-8 in the binder increased the maximum tensile strength ($\sigma_m$) at 40 percent elongation from 50 to 110 p.s.i. in a propellant containing 80 percent of solid.

There are indications that an increase of the solid content from 80 to 84 percent in the presence of polymer N-8 and a constant triol concentration, has no noticeable effect on the mechanical properties. The viscosity of the mix, however, is increased but the mixing is still easily done at 60° C.

An increase in the FeAA catalyst concentration reduced the curing of the propellant from 7 days to one day. The pot-life of the propellant was reduced to half an hour with 0.188 percent of FeAA in the binder. The increase of catalyst gave higher $\sigma_m$ and E but lower elongation. The viscosity of the propellant mixes was also increased, and concentration of catalyst over 0.1 percent of the binder should be avoided for practical purposes.

HTPB propellants may be cured at any temperature from 25 to 125° C. for one hour to 14 days, by adjusting the level of FeAA in the binder, but 60° C. is preferred. Curing at room temperature could be done on plant equipment but with possible additional difficulties because of the short pot1life and the viscosity of the mix.

In addition to their use as elastomeric binders for explosive use and rocket propellants, the hydroxy telechelic polymers of the present invention may also be used in non-explosive low temperature applications such as, for example, insulating foams and structural parts. The advantage being due to their aforesaid mechanical and thermal properties.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A curable mixture comprising:
   (a) a hydroxy-terminated polybutadiene which is the product of the reaction of a carboxyl-terminated homopolymer of butadiene having a molecular weight between about 3000 and 4000 and a molar excess of a mono-epoxide at 110° to 150° C. under superatmospheric pressure; and
   (b) a cross linking agent consisting of a diisocyanate and a triol cross-linking agent comprising the product of the reaction of a trimer acid obtained by the polymerization of an unsaturated C18 fatty acid and a molar excess of a mono-epoxide at 120° to 220° C. under superatmospheric pressure, wherein the equivalent weight ratio of isocyanate to total hydroxyl content in the mixture varies between 0.7 and 1.5.

2. The mixture of claim 1 wherein the mono-epoxide in (a) and (b) comprises an alkylene oxide of the formula

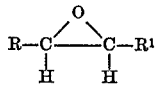

wherein each of R and R¹ is hydrogen or an alkyl radical containing from 1 to 6 carbon atoms.

3. The mixture of claim 2 wherein the mono-epoxide is selected from the group consisting of propylene oxide and 1,2-butylene oxide.

4. A curable mixture according to claim 1 wherein the molar ratio of mono-epoxide to carboxy terminated polybutadiene is from 17:1 to 50:1 and the molar ratio of mono-epoxide to trimer acid is from 14:1 to 20:1.

5. The mixture of claim 1 wherein the diisocyanate is tolylene diisocyanate.

6. The mixture of claim 1 including 10–20 weight percent based on the mixture of bis(2-ethylhexyl) azelate as plasticizer.

7. The mixture of claim 6 including 0.3 to 0.8 weight percent based on the mixture of a polymer made from n-methyl-diethylanolamine and sebacic acid as a wetting agent.

8. The mixture of claim 7 including .02 to 0.20 weight percent based on the mixture of ferric acetyl acetonate as a curing catalyst.

9. The mixture of claim 1 wherein the triol in (b) is present in an equivalent weight ratio of about .055 to .420 triol hydroxyl groups to total hydroxyl groups in the mixture.

10. The mixture of claim 8 wherein the triol in (b) is present in an equivalent weight ratio of about .055 to .420 triol hydroxyl groups to total hydroxyl groups in the mixture.

References Cited
UNITED STATES PATENTS

| | | | |
|---|---|---|---|
| 3,245,849 | 4/1966 | Klager et al. | 149—19 |
| 3,404,130 | 10/1968 | Sigura et al. | 260—94.7 NX |
| 3,558,564 | 1/1971 | Vasta | 260—77.5 |
| 3,607,976 | 9/1971 | Hsieh et al. | 260—94.2 X |
| 3,649,389 | 3/1972 | Barron | 149—19 |
| 3,661,840 | 5/1972 | Deutsch | 260—94.7 NX |
| 3,714,110 | 1/1973 | Verdol et al. | 260—33.6 AQ |

JOSEPH L. SCHOFER, Primary Examiner

W. F. HAMROCK, Assistant Examiner

U.S. Cl. X.R.

149—19; 260—77.5 AP, 94.7 A, N, 879, 887